United States Patent
Przybylko et al.

(10) Patent No.: US 9,443,207 B2
(45) Date of Patent: Sep. 13, 2016

(54) WATER AREA MANAGEMENT SYSTEM

(71) Applicant: The Boeing Company, Chicago, IL (US)

(72) Inventors: Joshua Przybylko, Boston, MA (US); John Lyle Vian, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 183 days.

(21) Appl. No.: 13/656,898

(22) Filed: Oct. 22, 2012

(65) Prior Publication Data
US 2014/0111332 A1 Apr. 24, 2014

(51) Int. Cl.
*G06Q 10/00* (2012.01)
*G08B 21/08* (2006.01)
*G05D 1/00* (2006.01)
*G08B 21/02* (2006.01)

(52) U.S. Cl.
CPC ........... *G06Q 10/00* (2013.01); *G08B 21/0269* (2013.01); *B64C 2201/141* (2013.01); *G05D 1/0027* (2013.01); *G05D 1/0088* (2013.01); *G08B 21/08* (2013.01)

(58) Field of Classification Search
USPC ............................... 340/539.1, 573.6; 455/40
See application file for complete search history.

(56) References Cited

U.S. PATENT DOCUMENTS

| | | | | |
|---|---|---|---|---|
| 6,056,237 A | * | 5/2000 | Woodland | B64C 3/40 244/120 |
| 6,558,218 B1 | * | 5/2003 | Hansen | 441/80 |
| 6,868,314 B1 | * | 3/2005 | Frink | 701/3 |
| 7,479,891 B2 | * | 1/2009 | Boujon | 340/573.6 |
| 2005/0270905 A1 | * | 12/2005 | Patterson et al. | 367/88 |
| 2005/0271266 A1 | * | 12/2005 | Perrier | 382/157 |
| 2009/0219393 A1 | * | 9/2009 | Vian et al. | 348/144 |
| 2009/0303055 A1 | * | 12/2009 | Anderson et al. | 340/573.6 |
| 2009/0319096 A1 | * | 12/2009 | Offer et al. | 701/2 |
| 2010/0312387 A1 | * | 12/2010 | Jang et al. | 700/248 |
| 2012/0065881 A1 | | 3/2012 | McIver et al. | |

FOREIGN PATENT DOCUMENTS

EP 1857769 A2 11/2007
WO 2009149428 A1 12/2009

OTHER PUBLICATIONS

EP Search Report, dated Jan. 9, 2014, regarding Application No. EP13189034.5, 6 pages.
European Patent Office Communication dated Jun. 6, 2016, regarding Application No. EP13189034.5, 5 pages.

* cited by examiner

*Primary Examiner* — Mohamed Barakat
(74) *Attorney, Agent, or Firm* — Yee & Associates, P.C.

(57) ABSTRACT

A method and apparatus for managing a recreational water area. A recreational water area management system comprises a water area manager. The water area manager is configured to receive information about a recreational water area from a group of autonomous vehicles, analyze the information to identify an event, and coordinate the group of autonomous vehicles to perform a mission in the recreational water area based on the event.

16 Claims, 14 Drawing Sheets

WATER AREA MANAGEMENT SYSTEM

BACKGROUND INFORMATION

1. Field

The present disclosure relates generally to water areas and, in particular, to managing water areas. Still more particularly, the present disclosure relates to a method and apparatus for monitoring and responding to safety related events in a recreational water area.

2. Background

Recreational water areas such as beaches and the water around the beaches are areas in which lifesaving operations may be performed for people involved in various activities at and around the beaches in these recreational water areas. For example, over 70,000 individuals are rescued each year from imminent peril at various beaches in the United States. Rescues may occur for individuals who are unable to swim in ocean waters, caught in rip currents, and/or encounter other conditions that may occur in the water.

These rescue missions involve lifeguards at the beaches. Lifeguards may be stationed at various lifeguard stands and other stations. Additionally, lifeguards also may move on vehicles to different locations to monitor the water in which recreational activities occur by the beaches.

The use of lifeguards is an expensive but necessary cost. With the use of lifeguards, however, the cost may restrain time periods when lifeguards are available. For example, lifeguards may only be available during normal operating hours of the beaches. After the normal operating hours, a smaller workforce of lifeguards may be present to monitor the same recreational water area. In some cases, after normal operating hours, lifeguards may be absent from the beaches. Moreover, less popular beaches may not be monitored at all.

As a result, individuals who use recreational water areas outside of normal operating hours or use recreational water areas where lifeguards are not present may find it more difficult to obtain assistance when needed. The absence or reduced number of lifeguards may make it more difficult to detect when individuals may need assistance after normal operating hours for a recreational water area.

Additionally, a desired number of trained lifeguards may be unavailable for use in recreational water areas. For example, even when funds are available for use to expand coverage areas or hours of operation for lifeguard services, the number of certified lifeguards available to work in the recreational water area may be fewer than desired. As a result, lifeguard services in the recreational water area may not be as effective as desired.

Further, even when more lifeguards are present during normal operating hours, the number of lifeguards monitoring a beach may not provide as much coverage as desired to monitor for events in which individuals may need assistance. For example, physical limitations of a lifeguard may limit the effectiveness of lifeguards in the recreational water area. As an example, a lifeguard may have difficulty seeing out into the water to identify that an individual is drowning at about 500 meters away. Further, even if the lifeguard does identify that the individual may be drowning, the time for the lifeguard to reach the individual may be more than desired. As a result, lifeguards may not identify all events in all of the different locations on the beach as quickly as desired and may not reach individuals needing assistance as quickly as desired.

Therefore, it would be desirable to have a method and apparatus that takes into account at least some of the issues discussed above, as well as other possible issues.

SUMMARY

In one illustrative embodiment, a recreational water area management system comprises a water area manager. The water area manager is configured to receive information about a recreational water area from a group of autonomous vehicles, analyze the information to identify an event, and coordinate the group of autonomous vehicles to perform a mission in the recreational water area based on the event.

In another illustrative embodiment, a method for managing a recreational water area is presented. Information about a recreational water area is received from a group of autonomous vehicles. The information is analyzed to generate an event. The group of autonomous vehicles is coordinated to perform a mission based on the event.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the use of lifeguards with existing equipment and procedures for recreational water areas such as beaches may not be the most desirable way to provide assistance to individuals in response to various events that may occur. The illustrative embodiments recognize and take into account that having lifeguards present for longer periods of time and increasing the number of lifeguards present still may not provide a desired level of safety in recreational water areas.

For example, the illustrative embodiments recognize and take into account that lifeguards may not consistently be able to identify events that require rescue missions as quickly as desired. Further, in some cases, with the use of lifeguards, only a small stretch of beach may be monitored at a time. Individuals outside of the area being monitored may be unable to obtain assistance in response to an event. The lifeguards may not see events occurring outside of the monitored area. The illustrative embodiments recognize and take into account that it may be desirable to use other types of resources to supplement the use of lifeguards in monitoring recreational water areas and providing assistance to individuals in the recreational water areas.

The illustrative embodiments recognize and take into account that unmanned vehicles and sensor systems may provide additional monitoring that may supplement or replace that provided by human lifeguards. With unmanned vehicles, sensor systems, or both, monitoring of beaches and the waters around the beaches may be performed continuously. Further, this monitoring may also be less prone to error and inconsistency than relying on lifeguards.

Thus, the illustrative embodiments provide a method and apparatus for managing water areas, and in particular, recreational water areas. In one illustrative embodiment, a recreational water area management system includes a water area manager configured to receive information about a recreational water area. The information is received from a group of autonomous vehicles.

The information is analyzed to identify an event in the recreational water area. The water area manager coordinates the group of autonomous vehicles to perform a mission in the recreational water area based on the event. In these illustrative examples, the event may be one that indicates that one or more individuals need assistance, more information is needed about a particular location or locations in the recreational water area, or some other situation that may require taking action.

Figure 1:
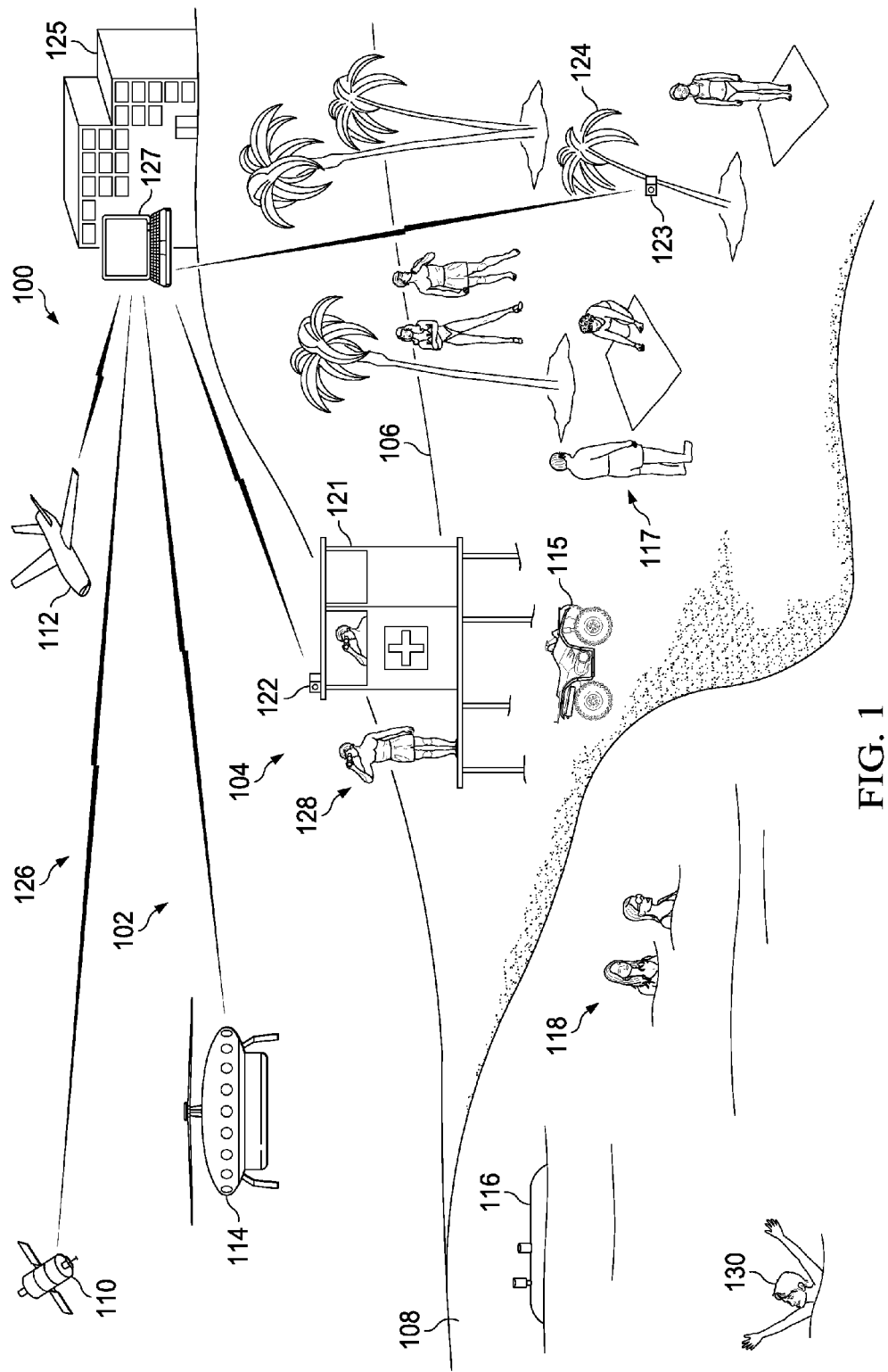
FIG. 1 is an illustration of a recreational water area management environment in accordance with an illustrative embodiment.

With reference now to the figures and, in particular, with reference to FIG. 1, an illustration of a recreational water area management environment is depicted in accordance with an illustrative embodiment. In this illustrative example, recreational water area management environment 100 includes various assets that may be used to monitor location 102 in recreational water area 104. In this illustrative example, location 102 in recreational water area 104 includes beach 106 and water 108 adjacent to beach 106.

In this illustrative example, satellite 110, unmanned aerial vehicle 112, unmanned aerial vehicle 114, unmanned ground vehicle 115, and unmanned water vehicle 116 may generate information about individuals 117 on beach 106 and individuals 118 in water 108 in location 102. This information may include information about the activities performed by individuals 117 on beach 106 and individuals 118 in water 108. Additionally, satellite 110, unmanned aerial vehicle 112, unmanned aerial vehicle 114, unmanned ground vehicle 115, and unmanned water vehicle 116 may generate information about the environment around individuals 117 and individuals 118 in location 102. These different vehicles may include on-board sensors that are configured to generate the information.

In these illustrative examples, lifeguard station 121 also may function as a support system. When lifeguard station 121 functions as a support system, lifeguard station 121 may provide support for at least one of unmanned aerial vehicle 112, unmanned aerial vehicle 114, unmanned ground vehicle 115, and unmanned water vehicle 116.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Lifeguard station 121 may provide a location to recharge batteries, store information, provide shelter, and/or provide other functions for these unmanned vehicles when lifeguard station 121 functions as a support system. Additionally, sensors also may be located on other platforms other than the satellite 110, unmanned aerial vehicle 112, unmanned aerial vehicle 114, unmanned ground vehicle 115, and unmanned water vehicle 116. For example, sensor 122 is associated with lifeguard station 121 in this illustrative example. As another example, sensor 123 is associated with tree 124.

When one component is "associated" with another component, the association is a physical association in the depicted examples. For example, a first component, sensor 123, may be considered to be associated with a second component, tree 124, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Sensor 122 and sensor 123 may be part of a sensor system. Further, the sensor system may generate information about individuals 117, individuals 118, and the environment around individuals 117 and individuals 118 in these illustrative examples. Other sensors may be located on satellite 110, unmanned aerial vehicle 112, unmanned aerial vehicle 114, unmanned ground vehicle 115, and unmanned water vehicle 116. These sensors also may generate information about individuals 117 on beach 106 and individuals 118 in water 108.

As depicted, the information generated by sensors in the sensor system and on the unmanned vehicles is sent as fast as possible without any intentional delays to control station 125. This information is considered to be sent in substantially real-time and is referred to as real-time information. As an example, this information is sent to control station 125 over wireless communications links 126.

In this illustrative example, water area manager 127 is located in control station 125. Water area manager 127 uses the information to monitor recreational water area 104 for events that may require rescue missions. In particular, water area manager 127 uses the information to monitor for events on beach 106, and in water 108, or both on beach 106 and in water 108 in location 102 of recreational water area 104. For example, water area manager 127 may determine whether an event such as a swimmer having difficulty swimming, a watercraft that is drifting, a fight between individuals, or some other event is present in recreational water area 104 that may require providing assistance.

Further, water area manager 127 also may use the information to monitor for conditions that may require rescue missions. For example, water area manager 127 may determine whether a rip current is present in water 108 within recreational water area 104. In another example, water area manager 127 may determine whether a shark is present in water 108 in or near location 102 in recreational water area 104. Based on these determinations, warning may be given to individuals 117 and individuals 118.

For example, when water area manager 127 identifies an event requiring a rescue mission from the information received, water area manager 127 may coordinate operation of unmanned aerial vehicle 112 and unmanned aerial vehicle 114 to perform or aid in the rescue mission. For example, water area manager 127 may instruct unmanned aerial vehicle 112 and unmanned aerial vehicle 114 to generate a warning for individuals 117 and individuals 118 in recreational water area 104.

Further, water area manager 127 also may notify personnel 128. Personnel 128 may include lifeguards, security, paramedics, medical professionals, coast guard personnel, and other suitable types of personnel. Water area manager 127 may direct personnel 128 to perform the rescue mission.

As depicted, unmanned aerial vehicle 112, sensor 122, or both may generate information about individual 130 in the form of video images. These video images are analyzed by water area manager 127. The analysis in this example may indicate that the actions of individual 130 in the video images is an event indicating that individual 130 may be having difficulty swimming in water 108.

Based on this event, water area manager 127 may initiate a rescue mission. Personnel 128 may be directed to perform a rescue mission to provide assistance to individual 130. As part of the rescue mission, unmanned aerial vehicle 114 may fly over individual 130 to indicate the location of individual 130 to personnel 128. One or more of personnel 128 may travel to the location of individual 130 based on the location of unmanned aerial vehicle 114.

Further, unmanned aerial vehicle 114 may be configured to assist individual 130 by deploying a tracking buoy or a floatation device in the location of individual 130 in water 108. In some cases, unmanned water vehicle 116 may be directed to the location of individual 130 such that individual 130 may use unmanned water vehicle 116 to return to beach 106. Of course, unmanned aerial vehicle 114, unmanned water vehicle 116, and personnel 128 may be used to aid in the rescue mission of individual 130 in other ways, depending on the particular implementation.

In this manner, with the use of unmanned aerial vehicles, sensor systems, and other devices, management of recreational water area 104 may be made more efficient and may provide for greater safety than possible with only personnel 128.

Figure 2:
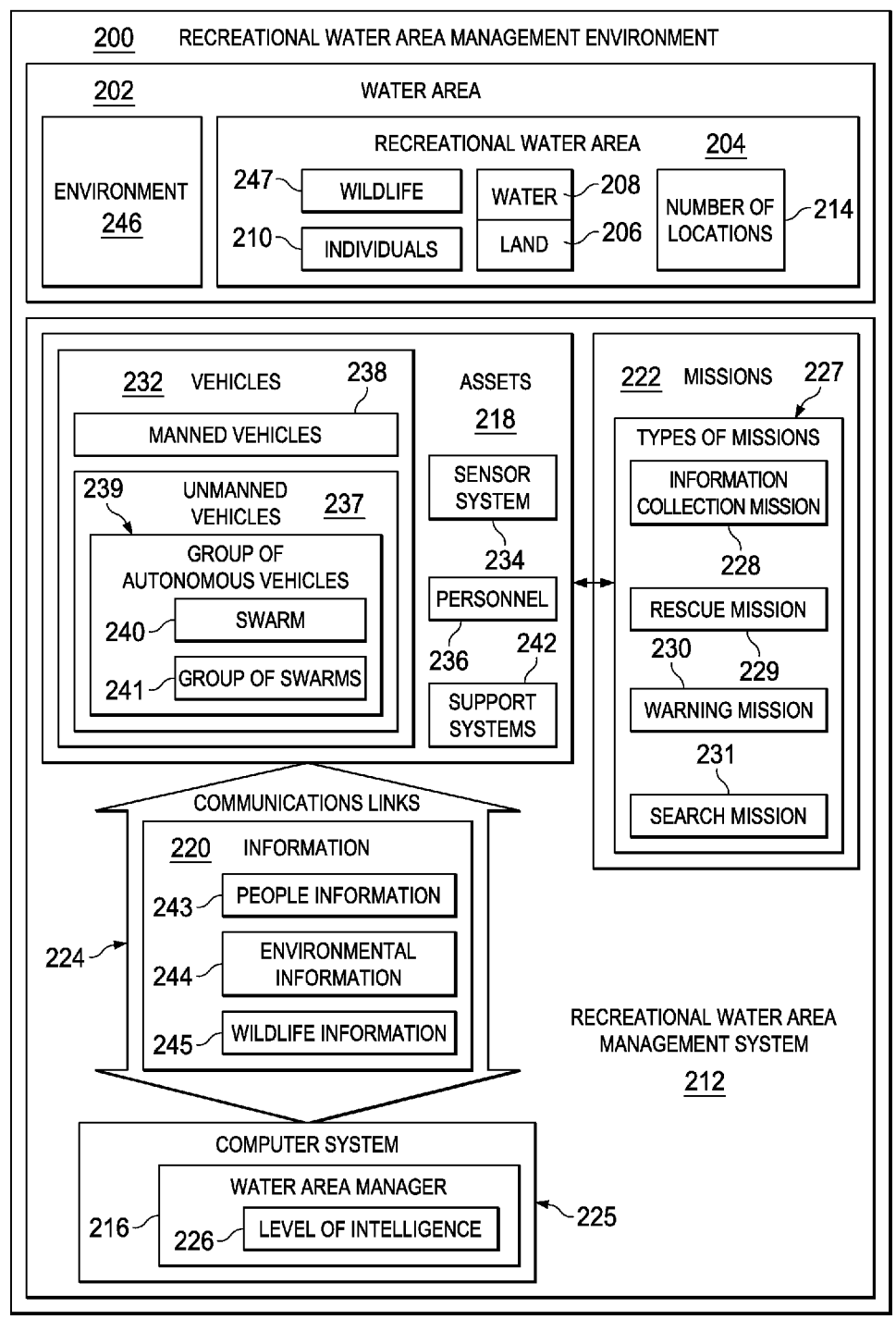
FIG. 2 is an illustration of a block diagram of a recreational water area management environment in accordance with an illustrative embodiment.

With reference now to FIG. 2, an illustration of a block diagram of a recreational water area management environment is depicted in accordance with an illustrative embodiment. In this depicted example, recreational water area management environment 100 is an example of one implementation of recreational water area management environment 200 shown in block form in this figure.

In this illustrative example, recreational water area management environment 200 includes water area 202. Water area 202 may be recreational water area 204. In these illustrative examples, recreational water area 204 includes land 206 and water 208.

Recreational water area 204 may take various forms. For example, recreational water area 204 may be an ocean, a beach, a river, a lake, a combination thereof, or other suitable area. For example, land 206 in recreational water area 204 may be beach 106 and water 208 may be water 108 in FIG. 1. In other illustrative examples, land 206 may be a cliff and water 208 may be a lake. Recreational water area 204 may be used for various activities such as rock fishing, water skiing, swimming, surfing, diving, and other suitable activities by individuals 210 in recreational water area 204.

In these illustrative examples, recreational water area management system 212 may be used to manage number of locations 214 in recreational water area 204. As used herein, a "number of" when used with reference to items means one or more items. For example, number of locations 214 is one or more locations.

Number of locations 214 includes locations in at least one of land 206 and water 208. In other words, number of locations 214 may include a portion of land 206, a portion of water 208, or some combination thereof.

In these illustrative examples, recreational water area management system 212 includes water area manager 216 and assets 218. Assets 218 are configured to generate information 220 that is used by water area manager 216 to coordinate missions 222 performed by assets 218 in number of locations 214.

In these illustrative examples, information 220 may be sent to water area manager 216 by assets 218 over communications links 224. Communications links 224 are wireless communications links in these illustrative examples.

As depicted, water area manager 216 may be implemented using hardware, software, or some combination of the two. When software is used, the operations performed by water area manager 216 may be implemented in program code configured to run on a processor unit. When hardware is employed, the hardware may include circuits that operate to perform the operations in water area manager 216.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, water area manager 216 may be implemented within computer system 225. Computer system 225 may include one or more computers. When more than one computer is present, those computers may be in communication with each other using a communications medium such as a network.

These computers may be in the same geographic location or separate geographic locations depending on the particular implementation. Further, in some illustrative examples, a portion or all of computer system 225 may be mobile. For example, one or more computers in computer system 225 may be located in or carried by a platform such as a truck, an aircraft, a ship, a human operator, or some other suitable platform.

In these illustrative examples, water area manager 216 may have level of intelligence 226. Level of intelligence 226 may vary depending on the implementation of water area manager 216. In some cases, water area manager 216 may be a computer program that receives input from a human operator and provides output to a human operator.

In other illustrative examples, level of intelligence 226 may be higher such that input from a human operator may be unnecessary. For example, an artificial intelligence system and other suitable types of processors may provide a desired level of intelligence for level of intelligence 226 in water area manager 216. In particular, the artificial intelligence system may include an expert system, a neural network, simple heuristics, fuzzy logic, Bayesian networks, or some other suitable type of system that provides a desired level of intelligence for level of intelligence 226 in water area manager 216.

In these illustrative examples, water area manager 216 may generate missions 222 performed by assets 218. Missions 222 may take a number of different forms. For example, missions 222 may include types of missions 227. In these illustrative examples types of missions 227 includes at least one of information collection mission 228, rescue mission 229, warning mission 230, and search mission 231, and other suitable types of missions.

In these illustrative examples, information collection mission 228 generates information 220 that may be used to initiate other missions in missions 222. As depicted, information collection mission 228 may be performed by assets 218 to generate information 220. For example, information collection mission 228 may include generating images of number of locations 214 in recreational water area 204. Additionally, information 220 also may include identifying a presence of activity by individuals 210 in recreational water area 204. This and other types of information in information 220 may be generated while performing information collection mission 228.

In these illustrative examples, rescue mission 229 may be performed by assets 218 with respect to one or more of individuals 210 on land 206, in water 208, or some combination thereof within recreational water area 204. In other illustrative examples, missions 222 may include warning mission 230. Warning mission 230 may provide warnings or alerts to individuals 210 about potentially unsafe conditions within number of locations 214 in recreational water area 204. These potentially unsafe conditions may include, for example, without limitation, a presence of sharks, jellyfish, rip currents, an oncoming thunderstorm, lightening, hazardous terrain concealed below the surface of the water, hazardous objects below the surface of the water, and other undesirable conditions that may be present in recreational water area 204.

In another illustrative example, search mission 231 may be used to locate persons reported as missing. For example, search mission 231 may be performed to find children separated from parents. Locating missing persons, in particular children, as quickly as possible is desired. In this illustrative example, unmanned vehicles 237, manned vehicles 238, fixed cameras, and other components in assets 218 may be used during search mission 231.

In these illustrative examples assets 218 may include a number of different types of components. For example, assets 218 may include at least one of vehicles 232, sensor system 234, personnel 236, and support systems 242.

Vehicles 232 may include on-board sensors configured to generate information 220. As depicted, vehicles 232 may include unmanned vehicles 237 and manned vehicles 238. Vehicles 232 may generate information 220 as vehicles 232 travel through or near number of locations 214 in recreational water area 204.

Manned vehicles 238 are vehicles that may carry personnel 236 and are operated by personnel 236. In yet other illustrative examples, manned vehicles 238 may be autonomous vehicles that carry personnel 236. In other words, in some illustrative examples, manned vehicles 238 may operate without input or control by personnel 236.

Unmanned vehicles 237 may be remotely controlled by personnel 236 or may be autonomous. In other illustrative examples, unmanned vehicles 237 may include a mix of remotely controlled and autonomous vehicles. As depicted, unmanned vehicles 237 may be selected from at least one of an unmanned aerial vehicle, an unmanned ground vehicle, an unmanned water vehicle, and other suitable types of unmanned vehicles. When unmanned vehicles 237 are unmanned water vehicles, the unmanned water vehicles may be used in an ocean, a sea, a lake, a pond, a river, or some other suitable type of body of water near land 206.

Additionally, unmanned vehicles 237 may include group of autonomous vehicles 239. As used herein, a "group" when used with reference to items means one or more items. For example, group of autonomous vehicles 239 is one or more autonomous vehicles. An autonomous vehicle is a vehicle that operates without intervention from a human operator. Group of autonomous vehicles 239 may be configured to operate as swarm 240 or group of swarms 241 in these illustrative examples when more than one autonomous vehicle is present in group of autonomous vehicles 239.

In this example, a swarm is a group of autonomous vehicles that work together. In a swarm, the vehicles may work with each other to accomplish a mission, task, operation, or some combination thereof. A swarm may have swarm intelligence. Swarm intelligence is the property of a system whereby the collective behaviors of vehicles interacting locally with their environment cause coherent functional global patterns to emerge. Swarm intelligence provides a basis with which it is possible to explore collective or distributed problem solving without centralized control or the provision of a global model.

In these illustrative examples, an autonomous vehicle in group of autonomous vehicles 239 may be remotely controlled or may have a desired level of intelligence. The level of intelligence for the autonomous vehicle may be located in the autonomous vehicle or in another location such as in computer system 225.

Support systems 242 are hardware systems configured to provide support for vehicles 232. In particular, support systems 242 may provide support for unmanned vehicles 237. For example, support systems 242 may provide shelter, power, maintenance, and other types of support for unmanned vehicles 237. In these illustrative examples, support systems 242 also may provide support for manned vehicles 238.

Sensor system 234 is also configured to generate information 220. In these illustrative examples, sensor system 234 is in fixed locations in number of locations 214 or near number of locations 214 in recreational water area 204. Sensor system 234 may include sensor 122 and sensor 123 in FIG. 1. Of course, sensor system 234 may include any number of sensors in fixed locations in recreational water area 204 in these illustrative examples.

Further, sensor system 234 may be placed in locations 214 or in other locations capable of generating information 220 about number of locations 214. In these illustrative examples, sensor system 234 may be distributed in various locations that provide an ability to generate a desired amount of information 220 about recreational water area 204.

Personnel 236 may be located in number of locations 214 or nearby. Personnel 236 may generate information 220 from observations made by personnel 236 in these illustrative examples.

Personnel 236 may perform information collection mission 228. For example, personnel 236 may look for situations in which individuals 210 may need assistance. Further, personnel 236 may perform information collection mission 228 by looking for other conditions such as rip current, sharks, or other undesired conditions. Personnel 236 may generate information 220 and send information 220 to water area manager 216. In some illustrative examples, personnel 236 may perform missions 222 without needing instructions from water area manager 216.

Personnel 236 also may perform missions 222. These missions may include, for example, information collection mission 228 for generating information 220, rescue mission 229, warning mission 230, and other suitable types of missions 222. Personnel 236 may carry sensors, operate manned vehicles 238, operate unmanned vehicles 237 that are not within group of autonomous vehicles 239, or may ride in unmanned vehicles 237 including group of autonomous vehicles 239.

As an example, in performing rescue mission 229, personnel 236 may walk, run, swim, or ride in vehicles 232 to perform different tasks in rescue mission 229. When performing warning mission 230, personnel 236 may verbally provide warnings to individuals 210 in recreational water area 204. In other cases, personnel 236 may provide warnings such as initiating operation of sirens, raising flags, or initiating operation of other suitable types of warning systems.

As depicted, information 220 may take a number of different forms. For example, information 220 may include people information 243, environmental information 244, wildlife information 245, and other suitable types of information.

People information 243 is information about individuals 210. People information 243 may include images, coordinates, and other suitable types of information about individuals 210. In these illustrative examples, people information 243 may include information about activities, location, state, and other suitable information about individuals 210.

In these illustrative examples, activities in people information 243 may be information about activities being performed by individuals 210. These activities may include, for example, without limitation, at least one of swimming, walking, running, playing sports, sunbathing, fighting, and other suitable activities. The location of individuals 210 may be the location of individuals 210 within recreational water area 204. This location information may take the form of two or three-dimensional coordinates depending on the particular implementation. For example, the information may be in terms of latitude, longitude, and altitude.

Environmental information 244 may be information about environment 246 in recreational area 204 as well as in other locations. Environment 246 may include at least one of current weather conditions, water currents, water temperature, wave height, wind, level of ultraviolet radiation, and other suitable types of information about environment 246.

As depicted, wildlife information 245 is information about wildlife 247 that may be in or near number of locations 214 in recreational water area 204. Wildlife information 245 may take various forms such as images, locations, identification of a presence of wildlife, and other suitable types of information about wildlife 247. Wildlife 247 may include, for example, without limitation, at least one of sharks, fish, jellyfish, and other types of animals that may be present on land 206 or in water 208 that may be hazardous to individuals 210. With the use of people information 243, environmental information 244, wildlife information 245, and other types of information in information 220, water area manager 216 may more efficiently manage recreational water area 204 with missions 222 than with currently used monitoring systems such as lifeguards.

Figure 3:
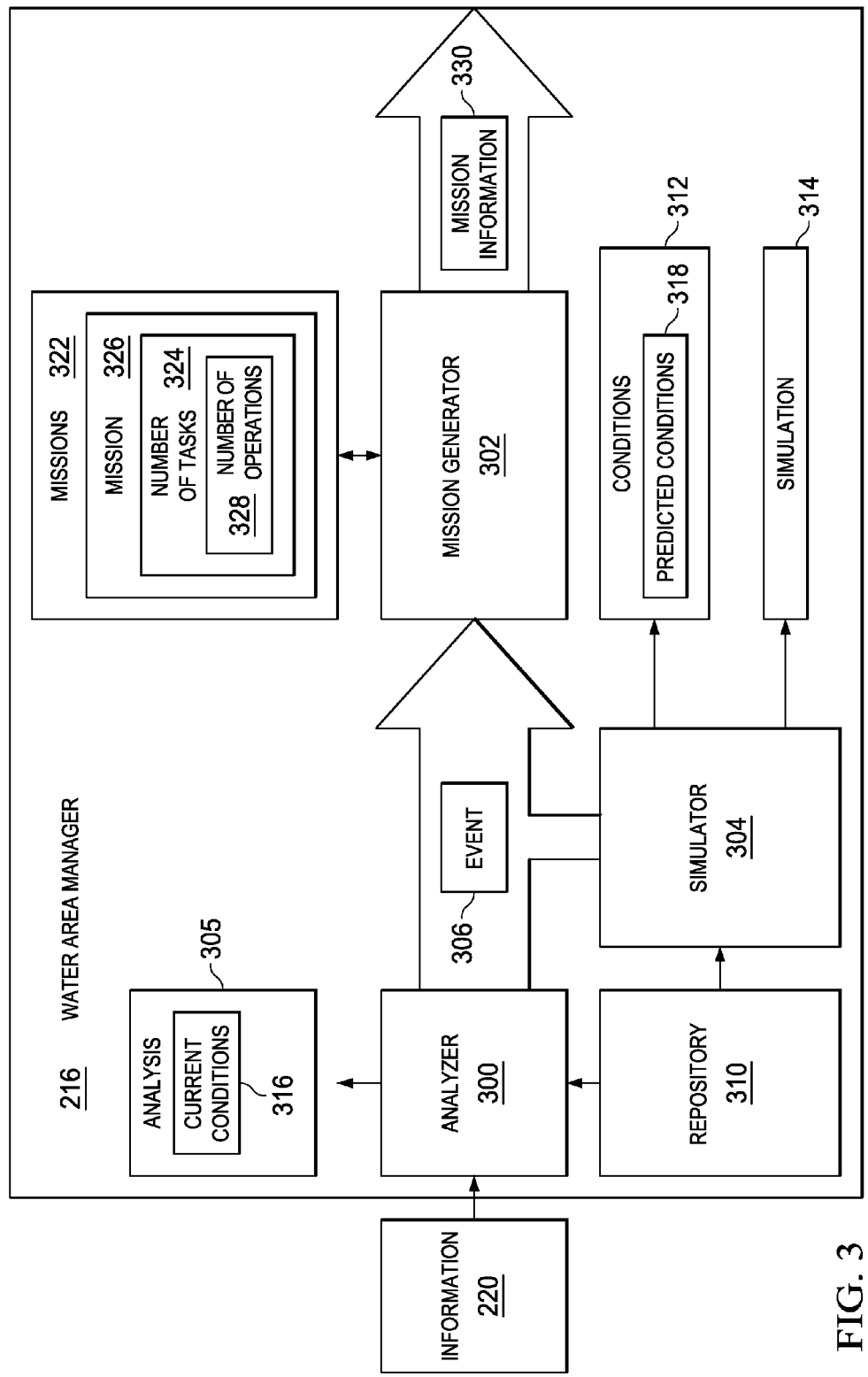
FIG. 3 is an illustration of a block diagram of a water area manager for a recreational water area in accordance with an illustrative embodiment.

With reference now to FIG. 3, an illustration of a block diagram of a water area manager for a recreational water area is depicted in accordance with an illustrative embodiment. In this illustrative example, examples of components for water area manager 216 are illustrated.

In this illustrative example, water area manager 216 includes a number of different components. As depicted, water area manager 216 includes analyzer 300, mission generator 302, and simulator 304. Analyzer 300 receives information 220 from assets 218 in FIG. 2. Analyzer 300 is configured to perform analysis 305 using information 220. Analysis 305 may be used to identify event 306.

Event 306 is an occurrence or activity that is significant enough to warrant identification of mission 326 in missions 222. The threshold for when event 306 occurs may be set using rules, policies, or other conditions. These rules, policies, and conditions may be the same or different with different types of land 206, water 208, or combinations of land 206 and water 208 in recreational water area 204 in FIG. 2.

Event 306 may take many different forms. For example, event 306 may be one of an individual drowning in water, an individual located outside an allowed zone, an individual having a cardiac condition, an individual choking, a fight between individuals, a presence of a rip current, a swimmer within a selected distance to a cliff face, a swimmer greater than a selected distance from a shore, a thunder storm within a selected distance to the recreational water area, lightening within a selected distance to the recreational water area, waves having a greater than desired height within a selected distance to the recreational water area, a shark within a selected distance to the recreational water area, a jelly fish within the recreational water area, an individual on land having a medical condition, an individual swept into the water, and a water vehicle disabled in the recreational water area. Of course, event 306 may be another occurrence or activity, depending on the particular implementation. For example, event 306 may also include a non-immediate hazard. An example of a non-immediate hazard may be, without limitation, a reporting of a missing child, a missing adult, a stalled car, a drifting boat, and other similar events. Of course, in the case of a missing person, such as a child, event 306 may be considered an immediate hazard, depending on the particular implementation.

As depicted, analysis 305 may be performed in a number of different ways to identify event 306. Analysis 305 may include inspecting, cleaning, transporting, modeling, and other operations with respect to information 220.

In this example, analysis 305 may be performed using any currently available analysis technique for information 220. For example, without limitation, analyzer 300 may perform analysis 305 of information 220 using image processing systems, light detection and ranging systems, geographic information systems, visual inspection systems, or other suitable types of systems. In particular, analyzer 300 may perform analysis 305 to identify event 306 by using data clustering and correlation, anomaly detection, statistical and prognostic methods, and other suitable types of data analysis techniques.

In performing analysis 305, analyzer 300 may use repository 310 to identify event 306 using information 220. For example, images in information 220 may be analyzed using repository 310 to determine whether event 306 is present. In one illustrative example, repository 310 may include models that indicate when an individual in individuals 210 in FIG. 2 may be drowning or having difficulty swimming.

For example, a model in repository 310 may be compared to images in information 220 to determine whether an individual in individuals 210 is having sufficient difficulty swimming to generate event 306. As depicted, models in repository 310 may include information about movements or positions that indicate that an individual is having difficulty swimming or may be drowning. Repository 310 may include information that may be used to identify other types of events in addition to an individual in individuals 210 that may be drowning.

In these illustrative examples, event 306 also may be generated by simulator 304. Simulator 304 is configured to simulate conditions 312 for number of locations 214 in recreational water area 204 in FIG. 2. These conditions may include, for example, at least one of conditions that may give rise to rip currents, larger than desired waves, thunderstorms, and other undesirable conditions that may occur in recreational water area 204.

Simulator 304 is configured to run simulation 314 to determine whether conditions 312 may be present that are at a level for generating event 306. In other words, simulation 314 may be used to identify current conditions 316 as well as predicted conditions 318. Predicted conditions 318 may be potential conditions in this illustrated example. Simulator 304 may generate event 306 when conditions 312 indicate an undesired condition with respect to activities performed by individuals 210 on land 206, in water 208, or some combination thereof.

Simulation 314 may be performed using repository 310. In particular, models in repository 310 may be used to perform simulation 314. For example, simulation 314 may be a simulation for a predicted condition in predicted conditions 318 such as a rip current.

As an example, a model in repository 310 may be used by simulator 304 to run simulation 314 to predict when a rip current may occur based on information 220 received from assets 218. Information 220 may include information about current weather, water temperature, and other suitable types of information. Additionally, information obtained from repository 310 may include information about predicted weather, and other suitable information that maybe used to predict when rip currents may be present in water 208 in number of locations 214 in FIG. 2. If a rip current is present in simulation 314, the rip current may be considered a predicted condition in predicted conditions 318.

As another illustrative example, simulator 304 may run simulation 314 to determine whether a presence of sharks may be a predicted condition in predicted conditions 318. In these illustrative examples, migration patterns of sharks may be included in models within repository 310. These migration patterns may be used to determine whether information collection mission 228 in FIG. 2 should be initiated in missions 222 to monitor for a presence of sharks in the area. Thus, the presence of sharks in simulation 314 may be a predicted condition in predicted conditions 318.

With the identification of event 306, mission generator 302 is configured to identify number of tasks 324 for mission 326 in missions 222. Additionally, mission generator 302 may generate one or more of missions 222 without identifying event 306. For example, one or more of missions 222 may be generated prior to obtaining information 220 about recreational water area 204. In this illustrative example, a "mission" is a goal or objective. In other words, mission 326 in missions 222 may be one or more goals or objectives.

For example, mission generator 302 is configured to identify number of tasks 324 for mission 326 in missions 222. In these illustrative examples, a "task" in number of tasks 324 is a piece of work that is to be performed to achieve mission 326. A task may be comprised of number of operations 328 that are performed for the piece of work.

Number of tasks 324 is one or more tasks to be performed by assets 218 in FIG. 2. Each task in number of tasks 324 may include one or more operations in number of operations 328. Mission generator 302 may also identify number of operations 328 for number of tasks 324 in generating mission 326.

For example, mission 326 may be information collection mission 228 for gathering information 220 about recreational water area 204. A task in number of tasks 324 may be to monitor a particular location in number of locations 214 in recreational water area 204. One or more operations in number of operations 328 for a task in number of tasks 324 may be, for example, to fly a selected path over the location in number of locations 214 in recreational water area 204 and to generate images of the location.

In these illustrative examples, mission generator 302 assigns at least one of mission 326, number of tasks 324, and number of operations 328 to assets 218. In other words, mission generator 302 may send different levels of mission information 330 to assets 218 depending on the intelligence of assets 218 that are to perform mission 326.

This mission information 330 may be the same mission information 330 sent to each of assets 218. In other illustrative examples, mission information 330 may be different for each of the assets in assets 218.

In some cases, the type of mission information 330 sent to particular assets in assets 218 may be determined by the location of assets 218 relative to objective of the mission. As an example, if an individual in individuals 210 is drowning, rescue mission 229 may be performed by the closest one of assets 218. In other cases, warning mission 230 may be performed by assets 218 in the closest proximity to individuals 210 in a particular area of recreational water area 204 to be warned. In this manner, mission generator 302 in water area manager 216 may coordinate the performance of mission 326 by sending mission information 330 to assets 218.

Mission information 330 may then be sent over communications links 224 to assets 218. Mission information 330 may include at least one of commands, directions, tasks, data, alerts, images, and other suitable information. Mission information 330 is sent to assets 218 to coordinate assets 218 in performing mission 326.

For example, mission generator 302 may generate mission 326 with number of tasks 324. Mission generator 302 assigns number of tasks 324 to group of autonomous vehicles 239. With the assignment of number of tasks 324 to group of autonomous vehicles 239, mission generator 302 sends mission information 330 to group of autonomous vehicles 239 to perform number of tasks 324 in mission 326.

In this manner, group of autonomous vehicles 239 may perform number of tasks 324 to complete all or a portion of mission 326. In some illustrative examples, mission generator 302 may assign a portion of number of tasks 324 to group of autonomous vehicles 239 and another portion of number of tasks 324 to manned vehicles 238 in FIG. 2. In this case, both group of autonomous vehicles 239 in unmanned vehicles 237 and manned vehicles 238 use mission information 330 to complete a portion of mission 326.

As an example, in generating rescue mission 229 for individual 130, mission generator 302 may send mission information 330 for mission 326 to unmanned aerial vehicle 112 to track individual 130 in FIG. 1. Mission generator 302 also may send mission information 330 to unmanned aerial vehicle 114 to fly over individual 130 to aid personnel 128 in identifying the location of individual 130 in water 108 in FIG. 1. At least one of unmanned aerial vehicle 112 and unmanned aerial vehicle 114 may generate video images of individual 130 for personnel 128.

In some illustrative examples, mission generator 302 may send mission information 330 to unmanned water vehicle 116 to move to the location of individual 130 to provide individual 130 a platform to hang on to while waiting for personnel 128 to reach individual 130. In still other illustrative examples, personnel 128 may not be involved in mission 326. Instead, unmanned water vehicle 116 may transport individual 130 to beach 106 in FIG. 1.

Mission information 330 may take various forms. As an example, number of tasks 324 may be sent in mission information 330 to group of autonomous vehicles 239 such that group of autonomous vehicles 239 performs number of operations 328 necessary to achieve number of tasks 324 in mission 326. In other cases, mission information 330 may include commands needed to perform number of operations 328 to complete number of tasks 324 for missions 222.

In some cases, an identification of mission 326 in mission information 330 may be sufficient for assets 218 to perform mission 326. In other cases, number of tasks 324 may be assigned to assets 218.

As an example, the assignment may involve assigning number of tasks 324 to one or more of group of autonomous vehicles 239. In other cases, number of tasks 324 may be assigned by sending number of tasks 324 to group of autonomous vehicles 239. Group of autonomous vehicles 239 may coordinate and make their own assignments after receiving number of tasks 324.

In other words, the assignment of number of tasks 324 may be to group of autonomous vehicles 239 as a whole or to individual autonomous vehicles in group of autonomous vehicles 239. When the assignment of number of tasks 324 is to group of autonomous vehicles 239 as a whole, specific tasks in number of tasks 324 may be distributed to autonomous vehicles in group of autonomous vehicles 239 based on the location of the autonomous vehicles, the capability of the autonomous vehicles, the response time of the autonomous vehicles, or some other suitable parameters. In other illustrative examples, group of autonomous vehicles 239 may operate as swarm 240 or as group of swarms 241 in FIG. 2.

In another illustrative example, mission generator 302 may send an identification of number of operations 328 to be performed by different assets in assets 218. These different assets may be, for example, unmanned vehicles 237 and sensor system 234. Number of operations 328 may be at various levels and may be as detailed as particular commands on direction of movement, when to collect information, and other operations. In this manner, water area manager 216 with analyzer 300, mission generator 302, and simulator 304 may identify event 306, generate mission 326, and send mission information 330 such that monitoring of recreational water area 204 is performed more efficiently than with the use of personnel 128 without assets 218.

Figure 4:
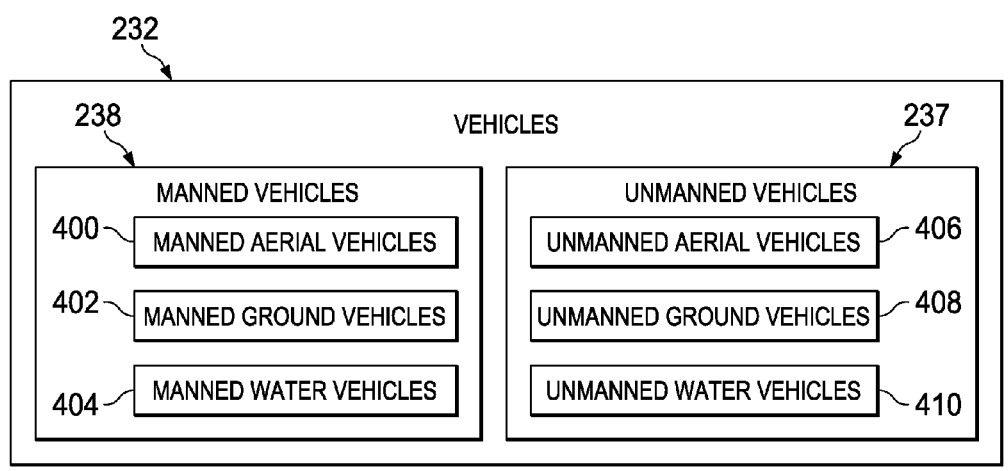
FIG. 4 is an illustration of a block diagram of examples of vehicles that may be used in managing a recreational water area in accordance with an illustrative embodiment.

Turning now to FIG. 4, an illustration of a block diagram of examples of vehicles that may be used in managing a recreational water area is depicted in accordance with an illustrative embodiment. In this depicted example, vehicles 232 in FIG. 2 may take a number of different forms.

For example, manned vehicles 238 may include a number of different types of vehicles. As an example, manned vehicles 238 may include at least one of manned aerial vehicles 400, manned ground vehicles 402, and manned water vehicles 404.

As depicted, manned aerial vehicles 400 may include, for example, without limitation, at least one of an airplane, a helicopter, and some other suitable type of aerial vehicle. Manned ground vehicles 402 may include at least one of a truck, a motorcycle, an all-terrain vehicle, a ground activity vehicle, a sport utility vehicle, and some other suitable type of vehicle capable of moving on land 206 in recreational water area 204. Manned water vehicles 404 may include at least one of a boat, a skiff, a personal watercraft, and some other suitable type of water vehicle. The type of manned vehicles 238 used in recreational water area 204 may depend on the type of terrain, weather conditions, size of area, and other suitable parameters in recreational water area 204.

Unmanned vehicles 237 may include a number of different types of vehicles. For example, unmanned vehicles 237 may include at least one of unmanned aerial vehicles 406, unmanned ground vehicles 408, and unmanned water vehicles 410.

As depicted, unmanned aerial vehicles 406 may include airplanes, helicopters, and other suitable types of unmanned aircraft. In these illustrative examples, an unmanned aerial vehicle may have various sizes and may take various forms. For example, unmanned aerial vehicles 406 may include a micro-air vehicle that may be carried by a person, an entomopter, a micro-helicopter, a ducted fan micro-helicopter, a man-portable unmanned aerial vehicle, and other suitable types of unmanned aerial vehicles.

Unmanned ground vehicles 408 also may take various forms. For example, an unmanned ground vehicle in unmanned ground vehicles 408 may be a tracked robot, an unmanned all-terrain vehicle, and other suitable types of ground vehicles that may be remotely operated or autonomous in design.

Unmanned water vehicles 410 also may be implemented using a number of different types of vehicles. For example, unmanned water vehicles 410 may be implemented as unmanned personnel watercrafts, unmanned skiffs, and other suitable types of unmanned water vehicles.

Figure 5:
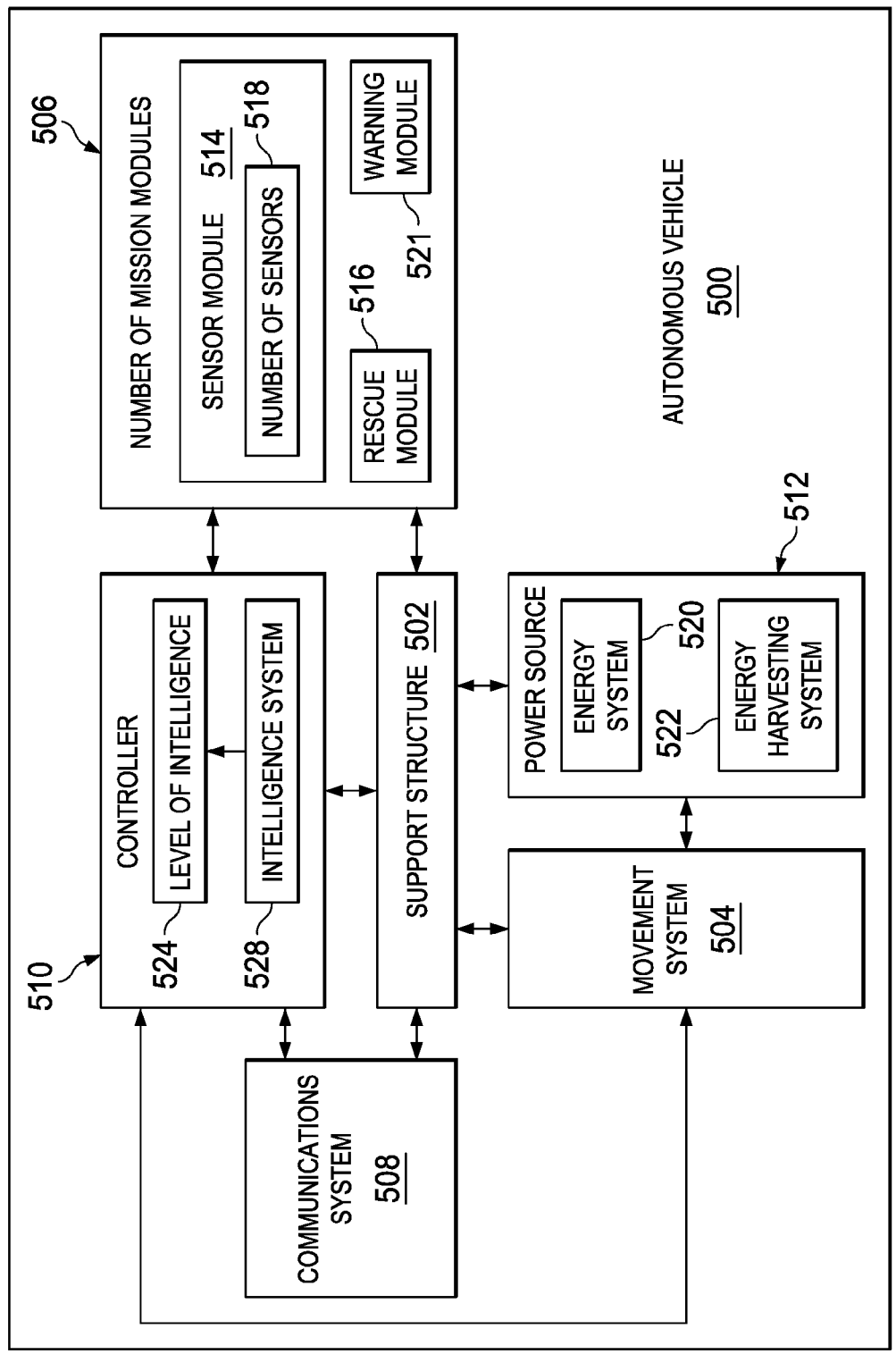
FIG. 5 is an illustration of a block diagram of an autonomous vehicle in accordance with an illustrative embodiment.

Turning now to FIG. 5, an illustration of a block diagram of an autonomous vehicle is depicted in accordance with an illustrative embodiment. In this depicted example, autonomous vehicle 500 is an example of one implementation for an autonomous vehicle within group of autonomous vehicles 239 in FIG. 2. Unmanned aerial vehicle 112, unmanned aerial vehicle 114, and unmanned water vehicle 116 are physical examples of unmanned vehicles that may be implemented as autonomous vehicles using components in autonomous vehicle 500.

In this illustrative example, autonomous vehicle 500 includes a number of different components. For example, autonomous vehicle 500 includes support structure 502, movement system 504, number of mission modules 506, communications system 508, controller 510, and power source 512.

Support structure 502 provides a structure for physical support of the other components in autonomous vehicle 500. Support structure 502 may be, for example, at least one of a frame, a housing, a body, and other suitable types of structures.

Movement system 504 is associated with support structure 502 and is configured to provide movement for autonomous vehicle 500. Movement system 504 may take various forms. For example, movement system 504 may include at least one of legs, wheels, tracks, and other suitable types of mechanisms for moving autonomous vehicle 500.

Number of mission modules 506 is a system associated with support structure 502. The types of number of mission modules 506 may vary depending on the mission for which autonomous vehicle 500 is configured to perform. For example, number of mission modules 506 may include at least one of sensor module 514, rescue module 516 and warning module 521. A module in number of mission modules 506 may be removable from autonomous vehicle 500. In other words, one mission module in number of mission modules 506 may be swapped out for another mission module in number of mission modules 506 in autonomous vehicle 500.

Sensor module 514 is configured to generate information about the environment around autonomous vehicle 500. In particular, number of sensors 518 in sensor module 514 may generate information about the environment around autonomous vehicle 500. Rescue module 516 is configured for use in performing a rescue mission. Rescue module 516 may be configured to perform a search and rescue mission in these illustrative examples. Warning module 521 is configured for use in providing warnings in a warning mission.

In this manner, creator versatility may be provided for autonomous vehicle 500. In particular, a mission module in number of mission modules 506 may be selected for use by autonomous vehicle 500 depending on the mission or task assigned to autonomous vehicle 500. As a result, as missions change or as needs change, number of mission modules 506 may be changed to suit the particular mission that may be assigned to autonomous vehicle 500. Further, with the use of number of mission modules 506, the weight of autonomous vehicle 500 may be reduced by reducing the number of missions in number of mission modules 506 only to those needed for a particular mission or task.

Communications system 508 is also associated with support structure 502. As depicted, communications system 508 is configured to provide communications between autonomous vehicle 500 and another device. This other device may be, for example, without limitation, one of other assets in assets 218, computer system 225, water area manager 216, and other suitable components. The communications may be wireless communications in these illustrative examples. In some cases, a wired communications interface may also be present.

Power source 512 is associated with support structure 502. Power source 512 is configured to provide power for the other components in autonomous vehicle 500. Power source 512 may take a number of different forms. For example, power source 512 may include at least one of energy system 520 and energy harvesting system 522.

In this illustrative example, energy system 520 may include one or more batteries. These batteries may also be modular and replaceable. In other illustrative examples, energy system 520 may be a fuel cell or some other suitable type of energy system.

Energy harvesting system 522 is configured to generate power for components in autonomous vehicle 500 from the environment around autonomous vehicle 500. For example, energy harvesting system 522 may include at least one of a biomechanical harvesting system, a piezoelectric harvesting system, a thermoelectric harvesting system, solar cells, a micro wind turbine generator, an ambient radio wave receiver, and other suitable types of energy harvesting systems that generate power from the environment around autonomous vehicle 500.

In this illustrative example, controller 510 is also associated with support structure 502. As depicted, controller 510 takes the form of hardware and may include software.

Controller 510 is configured to control the operation of autonomous vehicle 500. Controller 510 may provide level of intelligence 524. Level of intelligence 524 may vary depending on the particular implementation of autonomous vehicle 500. Level of intelligence 524 may be one example of level of intelligence 226 in FIG. 2.

In some cases, level of intelligence 524 may be such that controller 510 receives specific commands. These commands may include, for example, without limitation, a direction of travel, a waypoint, when to generate information 220 using sensor module 514, and other similar commands.

In other illustrative examples, level of intelligence 524 may be higher such that autonomous vehicle 500 may receive a task. Controller 510 may identify operations for performing the task. This task may be a fixed task in which autonomous vehicle 500 follows a path in a particular area to generate information 220 using sensor module 514.

In another illustrative example, controller 510 may receive a mission. Controller 510 may identify tasks and operations to perform the mission. For example, controller 510 may receive a rescue mission for a swimmer having difficulty swimming. Controller 510 may also identify tasks and operations to locate and provide assistance to the swimmer using rescue module 516 in number of mission modules 506.

In other illustrative examples, level of intelligence 524 may be even higher such that autonomous vehicle 500 is configured to communicate with other autonomous vehicles to coordinate performing one or more tasks. For example, controller 510 may include a circuit, a computer program, an artificial intelligence system, and other suitable types of processes that may provide a desired level for level of intelligence 524. This level for level of intelligence 524 and the communication with other autonomous vehicles to coordinate the performance of one or more tasks may allow autonomous vehicle 500 to operate within swarm 240 in FIG. 2 to perform a mission.

In these illustrative examples, intelligence system 528 may provide level of intelligence 524. Intelligence system 528 may use an expert system, a neural network, fuzzy logic, or some other suitable type of system to provide level of intelligence 524.

Level of intelligence 524 in controller 510 may allow for functions such as dynamic path planning. In this manner, obstacles may be identified along a path and may therefore be avoided. This identification and avoidance of obstacles may be performed in real time. These obstacles may include, for example, without limitation, a tree, a lifeguard station, a light pole, and other obstacles in recreational water area 204.

Controller 510 also may monitor health of different systems in autonomous vehicle 500. For example, controller 510 may monitor a level of energy being provided or remaining in power source 512. If power source 512 only includes batteries in energy system 520, controller 510 may direct autonomous vehicle 500 to return to base for the recharging or exchange of batteries.

In still other illustrative examples, controller 510 may monitor power source 512 such that the type of energy used switches from one of energy system 520 and energy harvesting system 522 to the other of energy system 520 and energy harvesting system 522. In this manner, controller 510 may extend the life of power source 512 in autonomous vehicle 500.

The illustration of autonomous vehicle 500 in FIG. 5 is not meant to imply limitations to the manner in which autonomous vehicle 500 may be implemented. In other illustrative examples, autonomous vehicle 500 may include other components in addition to or in place of the ones depicted.

Figure 6:
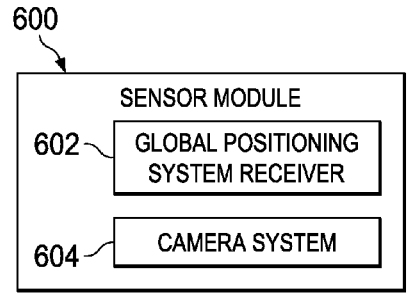
FIG. 6 is an illustration of a block diagram of a sensor module in accordance with an illustrative embodiment.

Turning now to FIG. 6, an illustration of a block diagram of a sensor module is depicted in accordance with an illustrative embodiment. In this illustrative example, sensor module 600 is an example of one implementation for sensor module 514 in FIG. 5. Sensor module 600 may be selected for use in information collection missions used to gather information for analysis.

As depicted, sensor module 600 includes a number of different components. Sensor module 600 may include global positioning system receiver 602 and camera system 604.

Global positioning system receiver 602 may be used to identify a location of global positioning system receiver 602 in autonomous vehicle 500 in three-dimensional coordinates. These coordinates may include latitude, longitude, and altitude. Global positioning system receiver 602 uses a satellite system to provide these three-dimensional coordinates.

Camera system 604 is configured to generate images. These images may be correlated with data for a point cloud. In these illustrative examples, camera system 604 may include one or more cameras. For example, camera system 604 may include a visible light camera, a stereographic camera, an infrared camera, and other suitable types of cameras. In some illustrative examples, camera system 604 may include multiple cameras of the same type, multiple cameras of different types, or some combination thereof.

Images using camera system 604 may be used to identify various types of information. In one illustrative example, images from camera system 604 may be used to identify individuals 210 in recreational water area 204 in FIG. 2. In another example, the images may be used to identify currents that may be present in the water 208 in FIG. 2. The images also may be used to identify a presence of wildlife 247 in FIG. 2 such as sharks, jellyfish, or other types of wildlife.

In other illustrative examples, other components such as sonar, radar, a laser altimeter, or other suitable types of sensors may be included in sensor module 600 in addition to or in place of global positioning system 602 and camera system 604, depending on the particular implementation. For example, sonar may be used by unmanned water vehicle 410 to locate and track objects under water 208. Sonar and radar may be used by other vehicles in unmanned vehicles 237 in some illustrative examples. As another example, a laser altimeter may be used to measure the average wave height within water area 202. The particular sensors used in sensor module 600 may depend on the particular use for sensor module 600, the type of information to be collected, or both.

Figure 7:
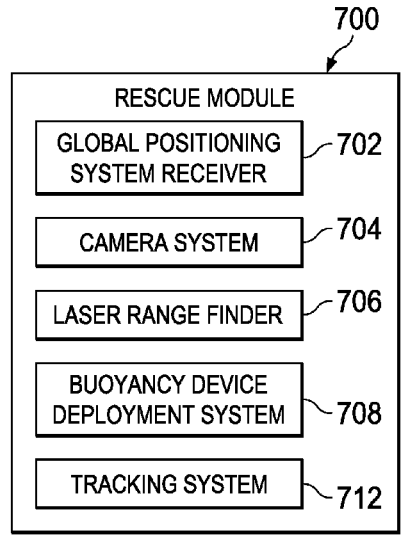
FIG. 7 is an illustration of a block diagram of a rescue module in accordance with an illustrative embodiment.

With reference now to FIG. 7, an illustration of a block diagram of a rescue module is depicted in accordance with an illustrative embodiment. Rescue module 700 is an example of one implementation for rescue module 516 in FIG. 5.

Rescue module 700 includes a number of different components. Rescue module 700 may be selected for use in performing rescue missions. For example, rescue module 700 may include global positioning system receiver 702, camera system 704, laser range finder 706, buoyancy device deployment system 708, and tracking system 712. Global positioning system receiver 702 and camera system 704 may be implemented in a manner similar to global positioning system receiver 602 and camera system 604 in FIG. 6.

In these illustrative examples, laser range finder 706 is configured to identify distances to different objects around autonomous vehicle 500 in FIG. 5. For example, laser range finder 706 may be used to find distances from autonomous vehicle 500 to objects such as an individual in the water, a watercraft, a shark, or other suitable objects.

Laser range finder 706 may generate three-dimensional coordinates for features around autonomous vehicle 500. In particular, laser range finder 706 may generate data for a point cloud. This point cloud may be used to generate a three-dimensional map of one or more locations in recreational water area 204.

Buoyancy device deployment system 708 is configured to deploy a number of buoyancy devices. These buoyancy devices may be, for example, at least one of a life vest, a life preserver, a life raft, and other suitable types of buoyancy devices.

As depicted, tracking system 712 may be used to track the location of an object in the water. For example, the object may be a swimmer, a boat, or some other suitable object. Tracking system 712 may deploy one or more tracking buoys into the water. These tracking buoys may use global positioning signals to identify the location of the tracking buoys in the water. These tracking buoys may then generate global positioning system coordinates identifying the location of the tracking buoys and transmit these coordinates to another device.

Figure 8:
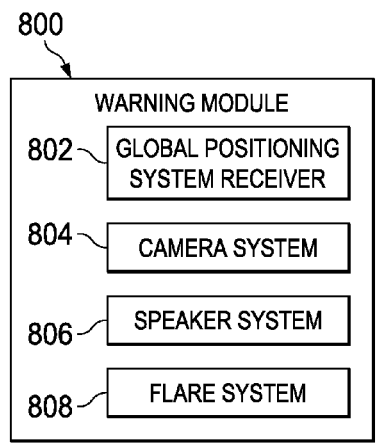
FIG. 8 is an illustration of a block diagram of a warning module in accordance with an illustrative embodiment.

Turning now to FIG. 8, an illustration of a block diagram of a warning module is depicted in accordance with an illustrative embodiment. In this illustrative example, warning module 800 is an example of one implementation for warning module 521 in FIG. 5.

In this illustrative example, warning module 800 includes a number of different components. For example, warning module 800 includes global positioning system receiver 802, camera system 804, speaker system 806, and flare system 808. Global positioning system receiver 802 and camera system 804 may be implemented in a manner similar to global positioning system receiver 602 and camera system 604 in FIG. 6.

Speaker system 806 may be used to provide audible warnings, verbal warnings, or some combination thereof. For example, speaker system 806 may be used to instruct swimmers that are farther away from the shore than desired to move closer to the shore. As another example, speaker system 806 also may be used to instruct individuals 210 to seek shelter if a thunderstorm is approaching recreational water area 204 in FIG. 2. These warnings and other types of warnings may be provided through speaker system 806.

Flare system 808 is configured to deploy flares. These flares may have different colors that may correspond to different types of warnings.

The illustration of autonomous vehicle 500 in FIG. 5 and the illustration of the different types of mission modules in FIGS. 6-8 are not meant to imply physical or architectural limitations to the manner in which an autonomous vehicle and mission modules may be implemented. For example, sensor module 600 may include a laser range finder to identify distances to objects in images generated by camera system 604. As another illustrative example, rescue module 700 may only include buoyancy device deployment system 708 or tracking system 712 rather than both of these systems.

As another illustrative example, warning module 800 may include other warning systems in addition to or in place of speaker system 806 and flare system 808. For example, warning module 800 may include a video screen, a projector, a flashlight, and other suitable devices for delivering warnings to individuals 210 in recreational water area 204.

Further, some of these mission modules may be implemented in stationary platforms rather than vehicles 232. For example, sensor module 600 may be used on a lifeguard station, a light pole, or other location. In other words, sensor module 600 may be used within sensor system 234 in FIG. 2.

Although number of mission modules 506 has been described as being removable, some mission modules in number of mission modules 506 may be fixed. For example, number of mission modules 506 may include sensor module 514 as a fixed module while other modules in number of mission modules 506 may be removable. As another illustrative example, although autonomous vehicle 500 has been described as operating without human operators, autonomous vehicle 500 may also carry human operators even though the operators may not direct the operation of autonomous vehicle 500. In this example, autonomous vehicle 500 may act as a transport.

Figure 9:
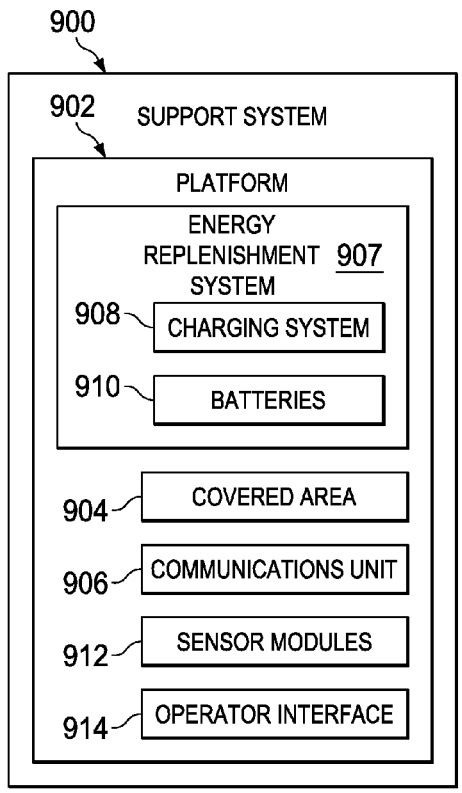
FIG. 9 is an illustration of a block diagram of a support system in accordance with an illustrative embodiment.

With reference now to FIG. 9, an illustration of a block diagram of a support system is depicted in accordance with an illustrative embodiment. In this illustrative example, support system 900 is an example of components that may be used in a support system in support systems 242 in FIG. 2.

As depicted, support system 900 has a number of different components. Support system 900 includes platform 902, covered area 904, communications unit 906, energy replenishment system 907, sensor modules 912, and operator interface 914.

In this illustrative example, platform 902 is a structure on which autonomous vehicle 500 in FIG. 5 may land or move onto depending on the particular implementation. Platform 902 may be a mobile platform, a stationary platform, or some other suitable type of platform in these illustrative examples.

Covered area 904 may be an area in which autonomous vehicle 500 may be sheltered from the environment. Communications unit 906 may provide communications with autonomous vehicle 500, water area manager 216, or some other suitable component.

Energy replenishment system 907 may include charging system 908, batteries 910, and other suitable components. Energy replenishment system 907 may be configured to recharge or otherwise provide energy system 520 in FIG. 5 with power.

Charging system 908 is configured to recharge energy system 520 in autonomous vehicle 500. Batteries 910 may be used to replace batteries in energy system 520 when batteries are used in energy system 520, instead of recharging batteries depending on the condition of the batteries.

Sensor modules 912 are examples of modules that may be replaceable in number of mission modules 506 in FIG. 5. Operator interface 914 may be a display system with a touch screen in these illustrative examples. Operator interface 914 may be viewed by personnel 236 to receive commands, missions, or other information about recreational water area 204 in FIG. 2. Operator interface 914 may also be used to input visual inspection results or other information that may be used by analyzer 300 to perform analysis 305 in FIG. 3.

The illustration of components in support system 900 in FIG. 9 is only shown as an example and is not meant to limit the manner in which other support systems in support systems 242 may be implemented. For example, other support systems in support systems 242 may omit communications unit 906. In still other illustrative examples, a support system in support systems 242 may include a storage device configured to store information generated by autonomous vehicle 500 or other platforms.

The illustration of recreational water area management environment 200 in FIG. 2 and the different components in FIGS. 2-9 are not meant to imply physical or architectural limitations to the manner in which recreational water area management environment 200 and the different components in recreational water area management environment 200 may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although sensor module 600 has been described with respect to being implemented in autonomous vehicles, sensor module 600 also may be used to implement components in sensor system 234 in FIG. 2. For example, sensor module 600 may be located on satellite 110 in FIG. 1 in sensor system 234.

In still other illustrative examples, water area manager 216 also may coordinate personnel 236, manned vehicles 238, or both along with autonomous vehicles 239 operating in swarm 240 or group of swarms 241. Further, in these illustrative examples, water area manager 216 may generate multiple missions 222 that may be performed at substantially the same time. For example, multiple information collection missions may be performed at the same time. In another illustrative example, rescue mission 229 may be performed at substantially the same time as information collection mission 228 in FIG. 2.

Further, in these illustrative examples, computer system 225 may be distributed such that personnel 236 may carry portions of computer system 225. For example, personnel 236 may carry mobile phones, tablet computers, laptop computers, and other suitable devices that may communicate with water area manager 216.

In yet other illustrative examples, other types of missions may be used in place of or in addition to the ones depicted in types of missions 227. For example, types of missions 227 also may include an enforcement mission. An enforcement mission is a mission used to enforce a rule, regulation, or law that may be broken by activities of individuals 210 in recreational water area 204. For example, a fight or other altercation may give rise to an enforcement mission to halt the fight or other altercation.

Further, the different components shown in FIG. 1 may be combined with components in FIGS. 2-9, used with components in FIGS. 2-9, or a combination of the two. Additionally, some of the components in FIG. 1 may be illustrative examples of how components shown in block form in FIGS. 2-9 can be implemented as physical structures.

For example, in some illustrative examples, manned vehicles 238 may be omitted from recreational water area management environment 200 in generating information 220 in FIG. 2. In still other illustrative examples, personnel 236 also may be unnecessary for generating information 220. In yet other illustrative examples, support systems 242 may be omitted. In still other illustrative examples, water area manager 216 may be located on one of vehicles 232.

In this manner, missions may be distributed among assets 218 that functional for a particular type or recreational water area 204. As a result, efficient and thorough monitoring and action may be performed by assets 218 with or without personnel 236 present in recreational water area 204.

Figure 10:
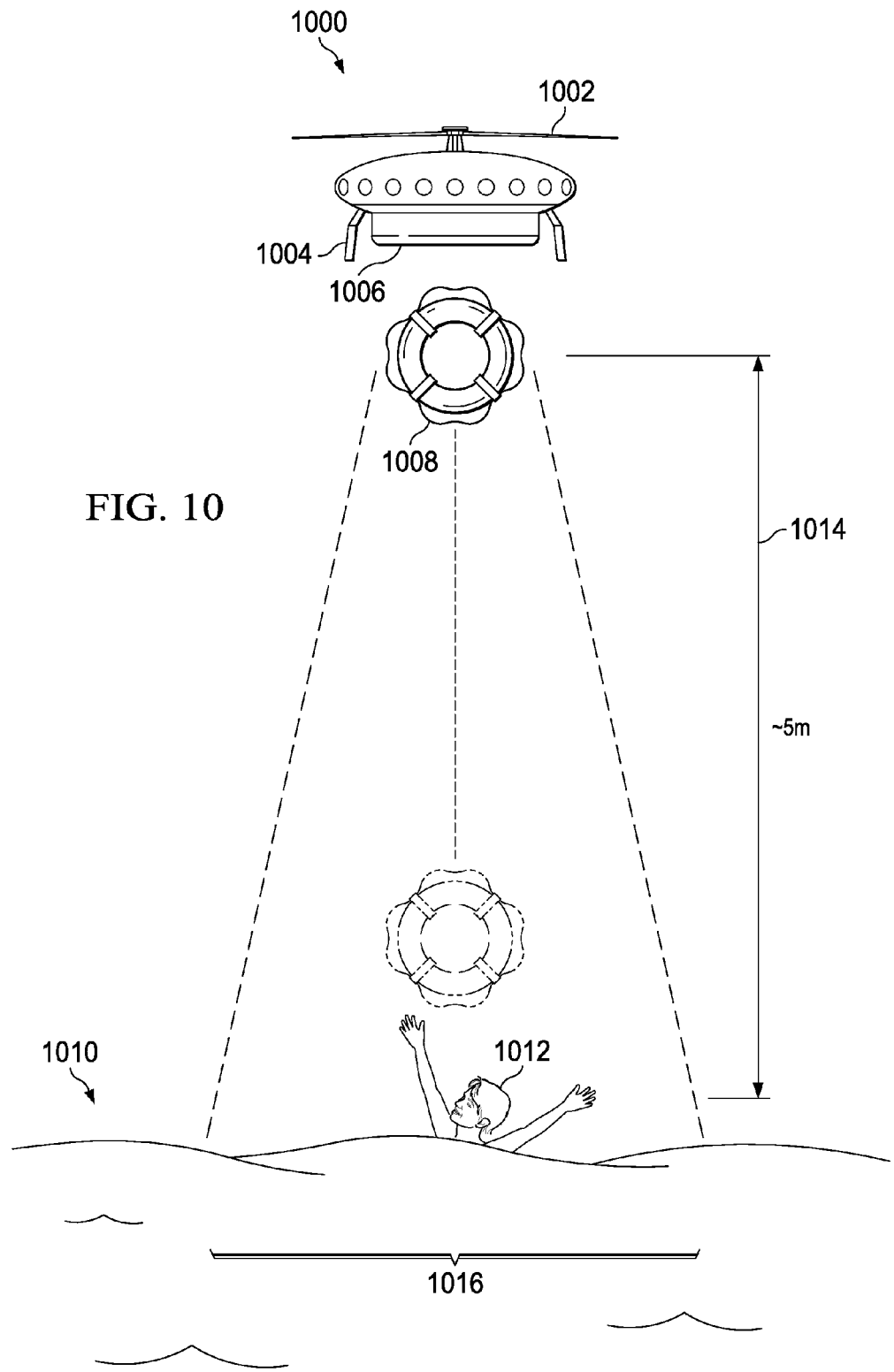
FIG. 10 is an illustration of an unmanned aerial vehicle performing a task during a rescue mission in accordance with an illustrative embodiment.

With reference next to FIG. 10, an illustration of an unmanned aerial vehicle performing a task during a rescue mission is depicted in accordance with an illustrative embodiment. In this illustrative example, unmanned aerial vehicle 1000 is an example of one implementation for an unmanned aerial vehicle in unmanned aerial vehicles 406 in FIG. 4. In this illustrative example, rotorcraft 1002 is an example of an implementation for an unmanned aerial vehicle in unmanned aerial vehicles 406 in FIG. 4. Further, rotorcraft 1002 may be an example of an implementation for autonomous vehicle 500 in FIG. 5. In these illustrative examples, rotorcraft 1002 may be a micro-air vehicle.

As depicted, rotorcraft 1002 has rescue module 1004. Rescue module 1004 includes buoyancy device deployment system 1006. Buoyancy device deployment system 1006 is configured to drop life preserver 1008 into water 1010 in these illustrative examples. Life preserver 1008 is an example of a buoyancy device.

In this illustrative example, rotorcraft 1002 is configured to drop life preserver 1008 into water 1010 near individual 1012 that has been identified as needing assistance. As depicted, rotorcraft 1002 may deploy life preserver 1008 from distance 1014 above water 1010. Distance 1014 may be about 5 meters in this particular example. Of course, distance 1014 may have other values depending on the particular implementation. For example, distance 1014 may be selected such that life preserver 1008 deploys into drop zone 1016.

In these illustrative examples, drop zone 1016 is an area in water 1010 in which individual 1012 may be able to quickly reach life preserver 1008. By dropping life preserver 1008 into drop zone 1016, individual 1012 may be able to remain afloat until rescue personnel are able to reach individual 1012.

Figure 11:
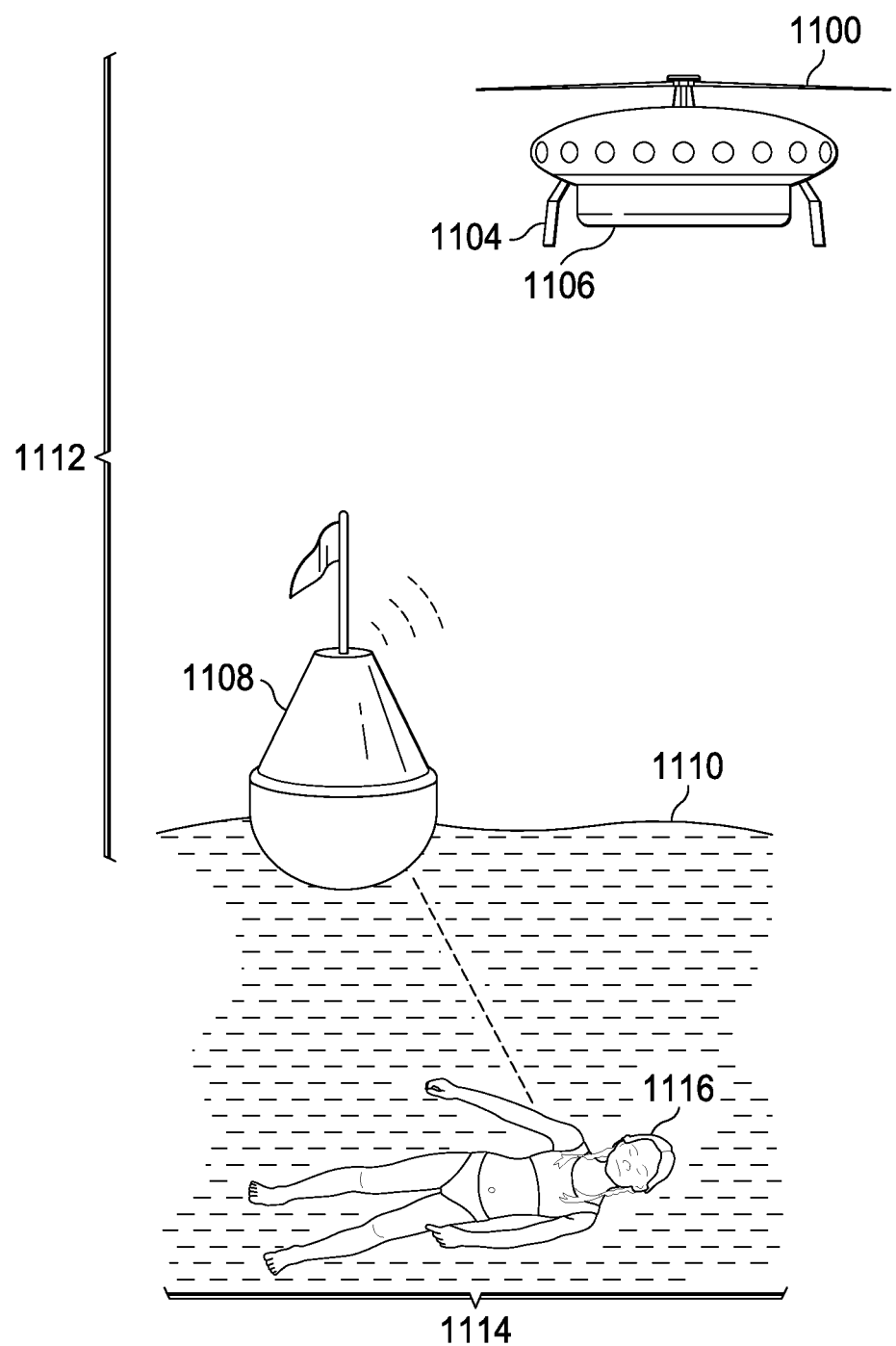
FIG. 11 is an illustration of an unmanned aerial vehicle performing a task in a rescue mission in accordance with an illustrative embodiment.

Turning now to FIG. 11, an illustration of an unmanned aerial vehicle performing a task in a rescue mission is depicted in accordance with an illustrative embodiment. In this illustrative example, the unmanned aerial vehicle may be rotorcraft 1100. Rotorcraft 1100 may be a micro-air vehicle in this particular example.

As depicted, rotorcraft 1100 includes rescue module 1104. Rescue module 1104 may be a search and rescue mission and may include tracking system 1106. Tracking system 1106 is configured to deploy tracking buoy 1108 into water 1110. In this illustrative example, tracking buoy 1108 may include a global positioning system transmitter as well as an ultrasound transmitter. These devices may emit signals with information that allow for an identification of the location of tracking buoy 1108 when deployed into water 1110.

As depicted, rotorcraft 1100 is located distance 1112 above water 1110. Distance 1112 may be selected such that tracking buoy 1108 may fall within drop zone 1114 around individual 1116. In this illustrative example, individual 1116 is located under water 1110. When deployed into water 1110, tracking buoy 1108 may provide information for identifying the location of individual 1116 that may be located under water 1110 in this illustrative example.

With the use of tracking buoy 1108, locating individual 1116 under water 1110 may be easier to perform. As a result, the amount of time needed to rescue individual 1116 may be reduced. In this manner, valuable minutes needed for resuscitation may be gained using tracking buoy 1108.

Figure 12:
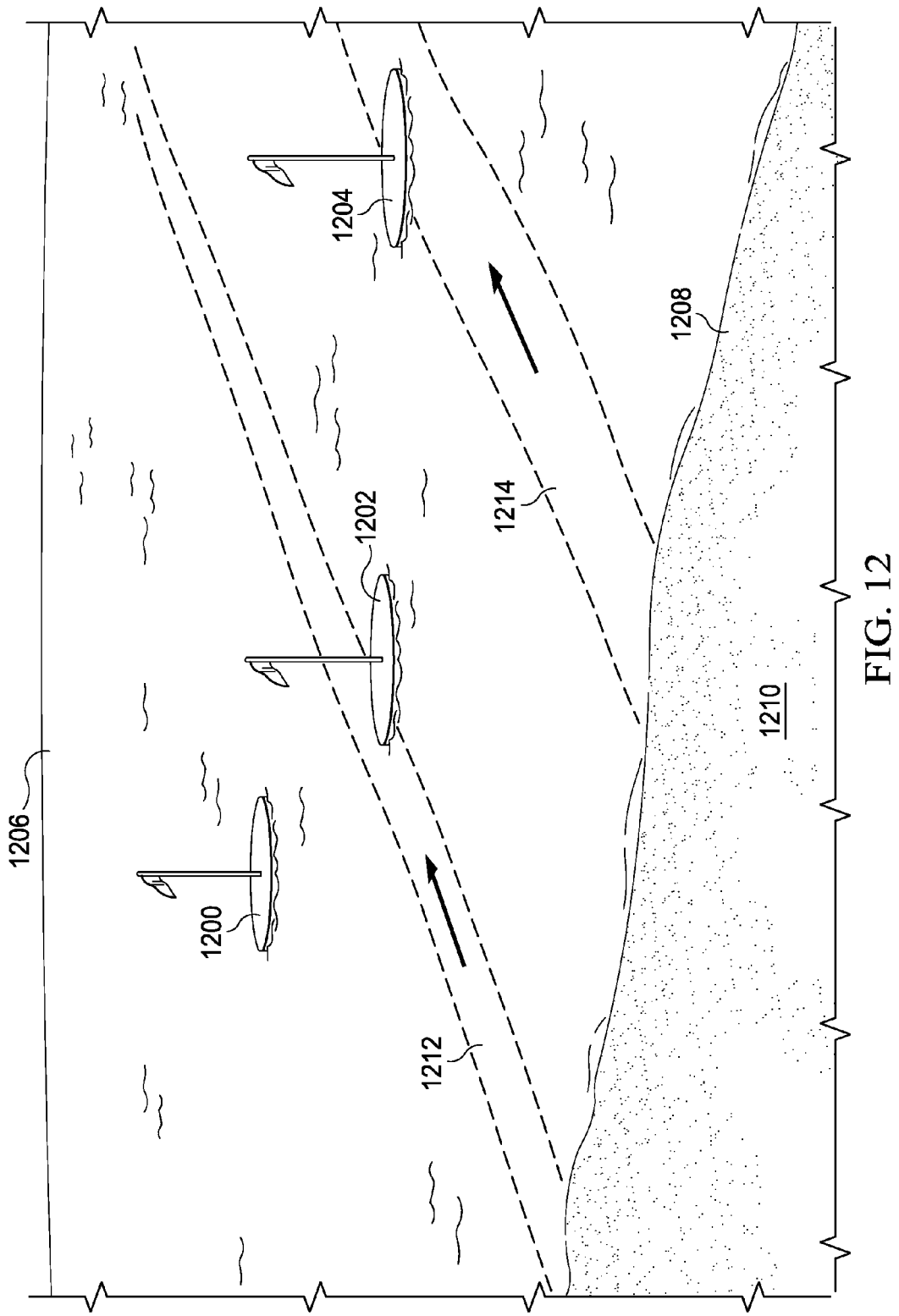
FIG. 12 is an illustration of autonomous vehicles generating information used to identify an event such as a rip current in accordance with an illustrative embodiment.

With reference now to FIG. 12, an illustration of autonomous vehicles generating information used to identify an event such as a rip current is depicted in accordance with an illustrative embodiment. In this depicted example, autonomous water vehicle 1200, autonomous water vehicle 1202, and autonomous water vehicle 1204 may drift in water 1206 along shore 1208 of beach 1210.

In this illustrative example, autonomous water vehicle 1200, autonomous water vehicle 1202, and autonomous water vehicle 1204 may measure water flow. The water flow may be measured by a sensor or may be measured through drifting of autonomous water vehicle 1200, autonomous water vehicle 1202, and autonomous water vehicle 1204.

For example, autonomous water vehicle 1202 measures current 1212, which has a speed of about 3 meters/second (m/s). Autonomous water vehicle 1204 measures current 1214, which has a speed of about 8 m/s. With the measurement of a current flow of 8 m/s in current 1214, this speed indicates the presence of a rip current in this particular example. This information may be used to generate an event. The event may result in a mission that provides a warning to individuals on beach 1210. In particular, the warning may be that no swimming is allowed in water 1206.

Figure 13:
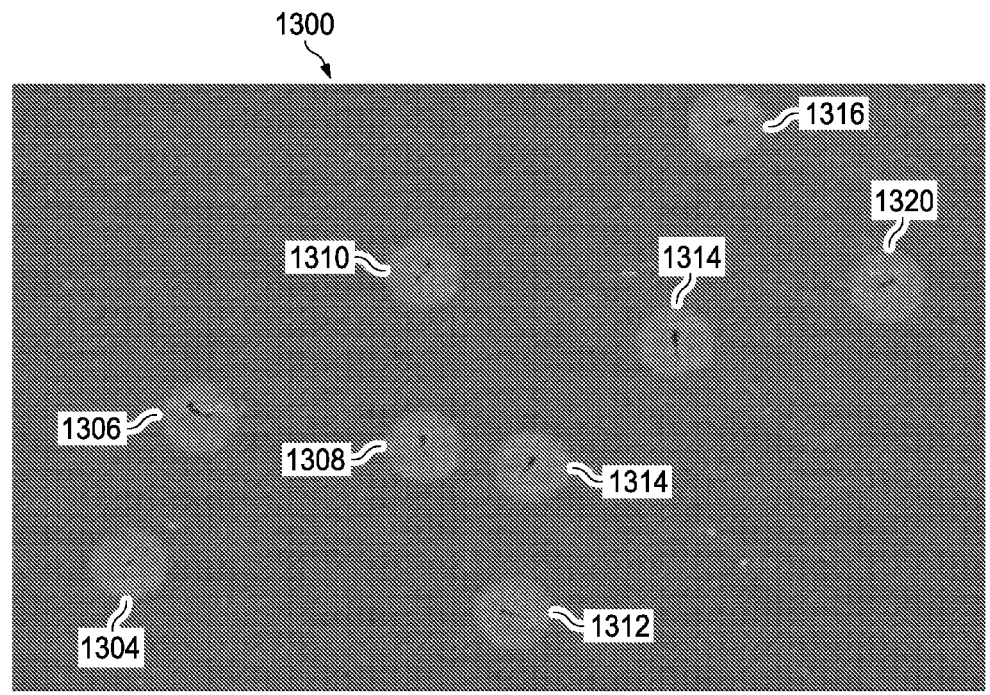
FIG. 13 is an illustration of information used to identify an event in accordance with an illustrative embodiment.

Turning now to FIG. 13, an illustration of information used to identify an event is depicted in accordance with an illustrative embodiment. In this depicted example, image 1300 is an example of an image that may be generated using camera system 604 in sensor module 600. Image 1300 may be generated by an unmanned aerial vehicle flying over the water.

In this illustrative example, image 1300 includes identification of sharks using graphical indicators 1304, 1306, 1308, 1310, 1312, 1314, 1316, 1318, and 1320. In this illustrative example, image 1300 may be analyzed by the unmanned aerial vehicle, water area manager 216, or some other suitable device. These graphical indicators may be added to image 1300 by the unmanned aerial vehicle or by water area manager 216 in these illustrative examples.

After an identification of sharks in this location, image 1300 may be presented to one or more of personnel 236 for verification. Graphical indicators 1304, 1306, 1308, 1310, 1312, 1314, 1316, 1318, and 1320 allow for quicker analysis of image 1300 by personnel 236.

Figure 14:
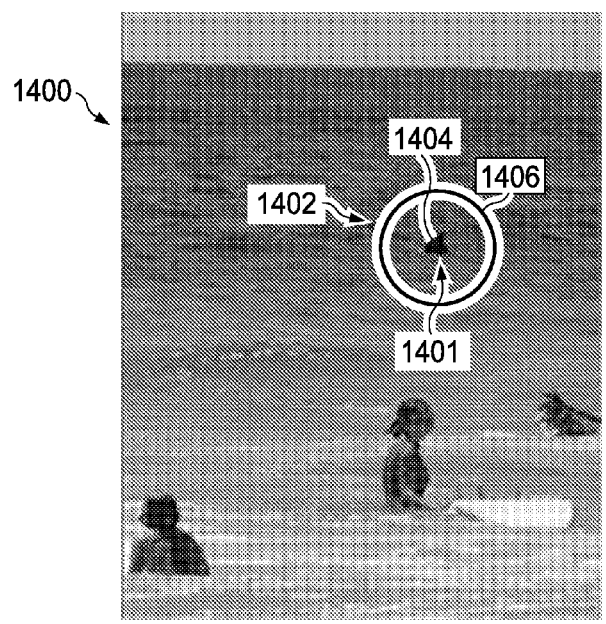
FIG. 14 is an illustration of an image including information for generating an event in accordance with an illustrative embodiment.

With reference now to FIG. 14, an illustration of an image including information for generating an event is depicted in accordance with an illustrative embodiment. In this depicted example, image 1400 is an example of an image that may be generated by camera system 604 when camera system 604 in sensor module 600 is located on land 206 in FIG. 2. In particular, this image may be taken from sensor module 600 located in a platform such as lifeguard station 121 on beach 106 in FIG. 1.

In this illustrative example, shark 1401 is identified in location 1402 from fin 1404. This identification may be made by water area manager 216. In particular, analyzer 300 and water area manager 216 may identify shark 1401 in location 1402 as event 306 needing mission 326 in FIG. 3.

As depicted, prior to initiating mission 326, or as part of initiating mission 326, verification may be obtained from personnel 236. In particular, image 1400 may be sent to personnel 236. In these illustrative examples, graphical indicator 1406 may be added to image 1400 by water area manager 216 to aid in a quicker review of image 1400 by personnel 236.

Figure 15:
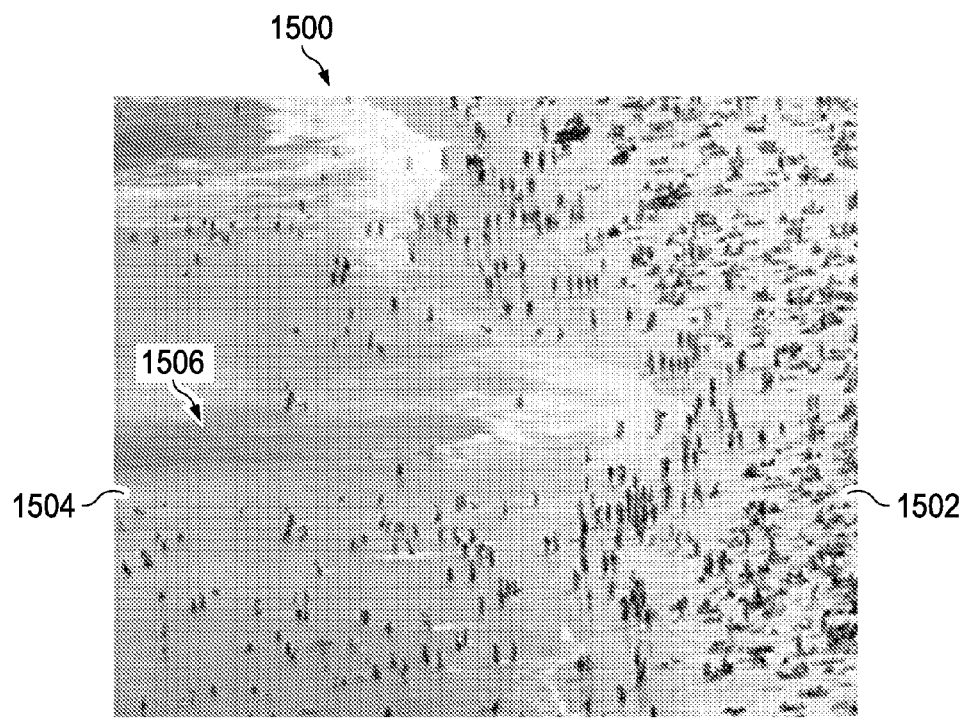
FIG. 15 is an illustration of an image used to identify the presence of a rip current in accordance with an illustrative embodiment.

Turning now to FIG. 15, an illustration of an image used to identify the presence of a rip current is depicted in accordance with an illustrative embodiment. In this depicted example, image 1500 is an image of beach 1502 and water 1504. In this illustrative example, image 1500 is an image generated by camera system 604 in sensor module 600 in FIG. 6. Sensor module 600 may be located in an unmanned aerial vehicle.

In this illustrative example, section 1506 in water 1504 indicates a presence of a rip current. As depicted, multiple images such as image 1500 may be taken over a period of time. This period of time may be every one-to-two seconds for about thirty minutes. With the use of these images, time exposure photography may be able to identify rip currents such as those in section 1506. A rip current appears as a dark ribbon in time exposure photographs because of an absence of white water. Section 1506 is an example of a dark ribbon indicating the presence of a rip current in image 1500.

Figure 16:
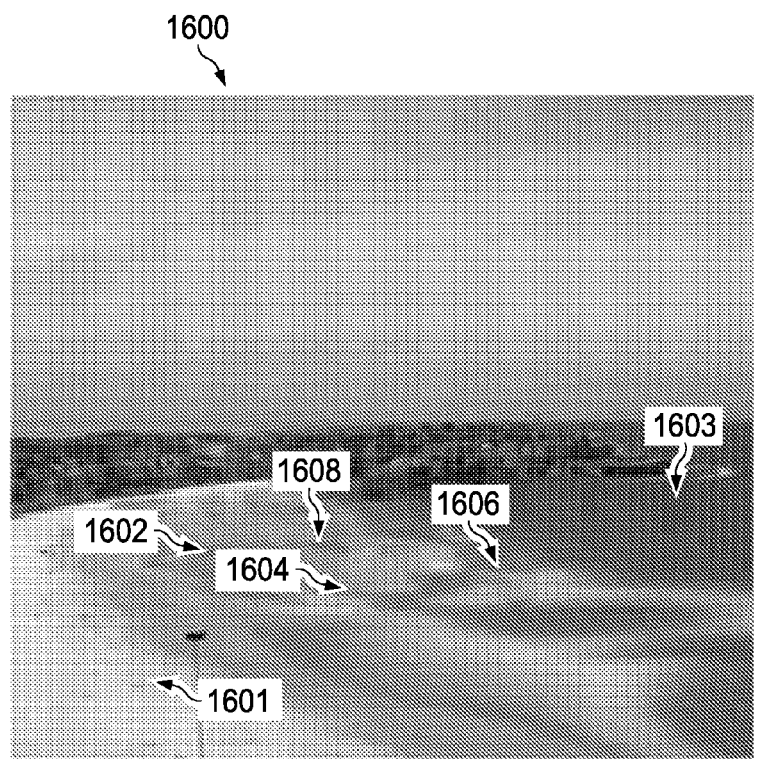
FIG. 16 is another illustration of an image used to identify the presence of rip currents in accordance with an illustrative embodiment.

Turning now to FIG. 16, another illustration of an image used to identify the presence of rip currents is depicted in accordance with an illustrative embodiment. In this illustrative example, image 1600 is an image generated from camera system 604 in sensor module 600 in FIG. 6. Sensor module 600 may be located in an unmanned aerial vehicle.

In this depicted example, image 1600 is an image that may be analyzed to identify rip currents. This image indicates that rip currents are forming in section 1602 and section 1604 in image 1600. These rip currents may not be visible to personnel 236 or other human assets if these human assets are not trained to identify conditions in which rip currents are forming.

Additionally, multiple images may be taken of beach 1601 and water 1603 using time-lapse photography to form image 1600. As depicted, camera system 604 takes an image every second over a desired period of time. As an example, camera system 604 may take images every second for thirty minutes. Of course, images may be taken by camera system 604 more or less frequently over a shorter or longer period of time, depending on the particular implementation. The frequency and duration of the operation of camera system 604 may change depending on time of day, season, number of assets 218 present in the area, some combination thereof, or other suitable factors. Thus, in this example, image 1600 is a combination of images taken by camera system 604 over the desired period of time.

In these illustrative examples, image 1600 may be used to identify rip currents as the rip currents are forming. For example, light areas 1606 seen in image 1600 may represent locations in which waves are breaking in recreational water area 204. Dark areas 1608 in image 1600 may indicate the location of rip currents because waves do not break over rip currents and thus, light areas 1606 of image 1600 may not result in these locations. From the identification of light areas 1606 and dark areas 1608 in image 1600, water area manager 216 may identify potentially dangerous conditions in recreational water area 204.

As an example, a computer image recognition system in analyzer 300 in FIG. 3 may be programmed to identify dark areas 1608 in image 1600. The identification of dark areas 1608 may be used by analyzer 300 in analysis 305 of current conditions 316 in FIG. 3 to detect potential rip currents before the rip currents are fully formed.

As a result, rip currents may be identified before the rip currents become dangerous to individuals 210 in recreational water area 204. Further, mission generator 302 may generate missions 222 based on the information about rip currents in image 1600 such that missions 222 are performed to warn individuals 210 in section 1602 and section 1604 of recreational water area 204 or to evacuate individuals 210 from section 1602 and section 1604 of recreational water area 204 before these rip currents become dangerous.

Figure 17:
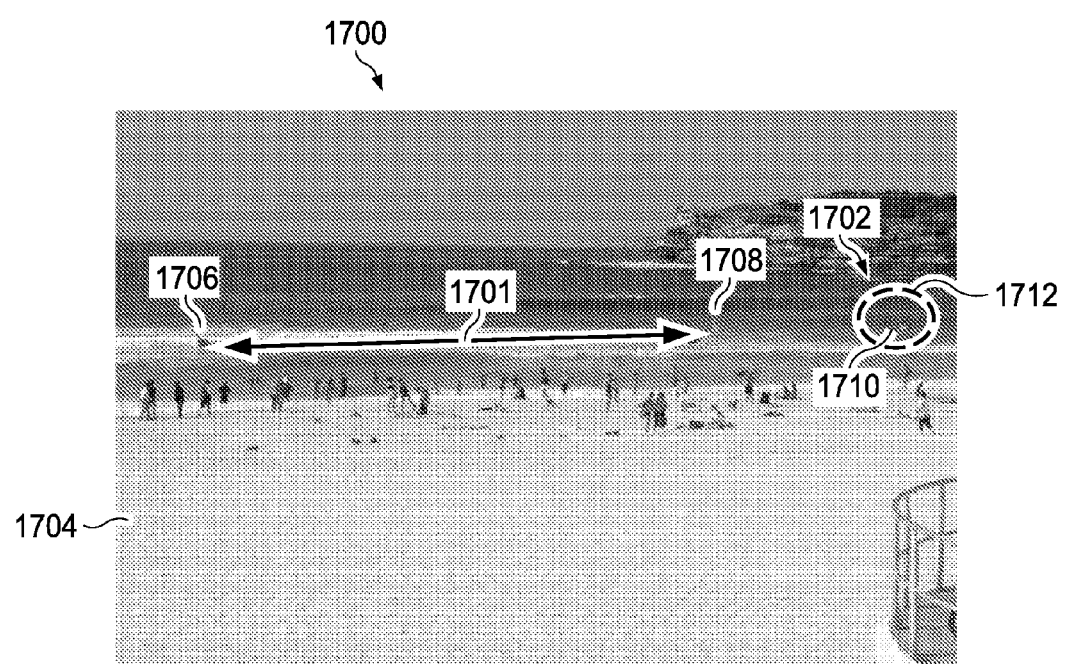
FIG. 17 is an illustration of an image used to identify events in accordance with an illustrative embodiment.

Turning now to FIG. 17, an illustration of an image used to identify events is depicted in accordance with an illustrative embodiment. In this illustrative example, image 1700 is an image generated from camera system 604 in sensor module 600 in FIG. 6. Sensor module 600 may be located in lifeguard station 121 in FIG. 1.

In this illustrative example, image 1700 may be analyzed to identify individuals that may be outside of designated swimming area 1701 in water 1702 off of beach 1704. As depicted, the designated swimming areas are designated by flag 1706 and flag 1708.

In this particular example, individual 1710 is outside of designated swimming area 1701. Graphical indicator 1712 in image 1700 may be added by water area manager 216 in FIG. 2. Image 1700 with graphical indicator 1712 may be sent to personnel 236 for use in performing a mission such as warning mission 230 to tell individual 1710 to move back inside of designated swimming area 1701.

In another illustrative example, image 1700 may be used to identify individual 1710 and other individuals swimming outside of designated swimming area 1701 such that personnel 236 and/or other assets 218 may monitor these individuals. Further, image 1700 with individual 1710 may be compared to image 1600 in FIG. 16 to identify individuals near rip currents in recreational water area 204.

In still other illustrative examples, image 1700 may be compared to other information 220 about hazardous conditions in recreational water area 204 to determine whether individual 1710 is within close proximity to these hazardous conditions. Personnel 236 and other assets 218 may use these comparisons to perform warning mission 230, rescue mission 229, or both in these illustrative examples.

The different illustrations in FIGS. 10-17 are not meant to apply limitations the manner in which missions may be performed and images may be generated. For example, images may not include graphical indicators in some illustrative examples. For example, graphical indicators may not be included when the images are not used by personnel 236. In still other illustrative examples, a rotorcraft may deploy both a buoyancy device and tracking buoy to an individual in the water. In yet another illustrative example, a watercraft may move to an individual in the water and act as a buoyancy device for the individual.

Figure 18:
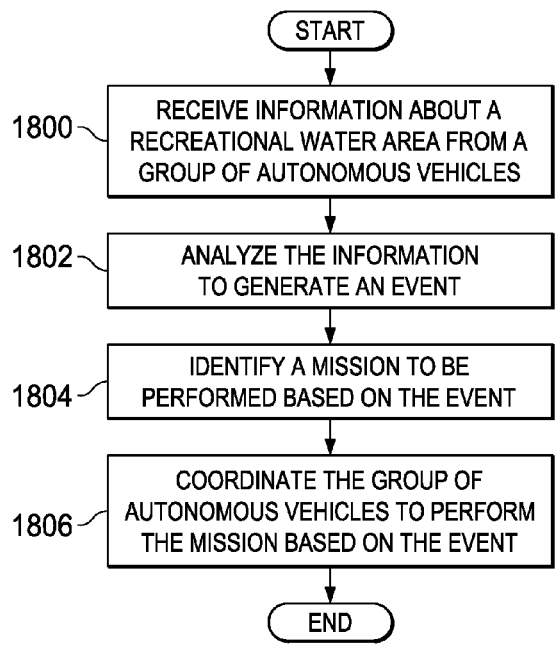
FIG. 18 is an illustration of a flowchart of a process for managing a recreational water area in accordance with an illustrative embodiment.

Turning now to FIG. 18, an illustration of a flowchart of a process for managing a recreational water area is depicted in accordance with an illustrative embodiment. The process illustrated in FIG. 18 may be used to manage an area such as recreational water area 204 in FIG. 2. The process illustrated in FIG. 18 may be implemented using water area manager 216.

The process begins by receiving information about a recreational water area from a group of autonomous vehicles (operation 1800). Of course, other information may be received from other assets other than autonomous vehicles in operation 1800. For example, information also may be received from a sensor system, personnel, and sensors in manned vehicles.

The process then analyzes the information to generate an event (operation 1802). The process identifies a mission to be performed based on the event (operation 1804). In these illustrative examples, the mission may take various forms. For example, the mission may be an information collection mission, a rescue mission, a warning mission, or some other suitable type of mission.

The process then coordinates the group of autonomous vehicles to perform the mission based on the event (operation 1806) with the process terminating thereafter. The coordination of the group of autonomous vehicles may also include coordinating other assets depending on the particular implementation.

Figure 19:
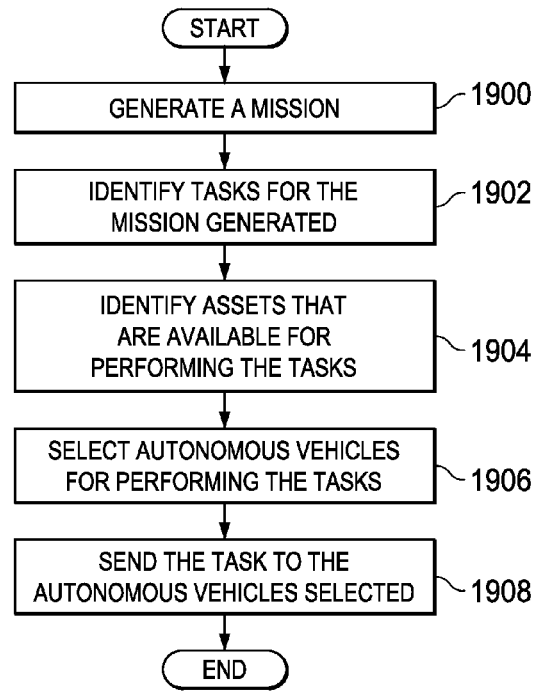
FIG. 19 is an illustration of a flowchart of a process for coordinating the operation of assets in accordance with an illustrative embodiment.

With reference now to FIG. 19, an illustration of a flowchart of a process for coordinating the operation of assets is depicted in accordance with an illustrative embodiment. The process illustrated in FIG. 19 may be implemented in water area manager 216 in FIG. 2. In particular, this process may be implemented within mission generator 302 in water area manager 216 in FIG. 3.

The process begins by generating a mission (operation 1900). This mission may be generated based on an event that is generated from information received from assets in or around a recreational water area. In still other illustrative examples, the mission may be generated based on a user input. For example, an operator may select a mission such as an information collection mission to be performed by the assets.

The process identifies tasks for the mission generated (operation 1902). These tasks may be obtained from a pre-selected template of tasks for missions. In other illustrative examples, the tasks may be generated by water area manager 216 when water area manager 216 has level of intelligence 226 that allows for formulating tasks. For example, water area manager 216 may implement artificial intelligence processes.

Next, the process identifies assets that are available for performing the tasks (operation 1904). In these illustrative examples, the assets may be a portion or all of a group of autonomous vehicles that are available for use by water area manager 216.

The process then selects autonomous vehicles for performing the tasks (operation 1906). In these illustrative examples, each autonomous vehicle may be assigned a task or a group of autonomous vehicles may be assigned one or more tasks to perform the tasks as a swarm.

The process then sends the tasks to the autonomous vehicles selected (operation 1908) with the process terminating thereafter. In this manner, the different operations illustrated in FIG. 19 may be used to coordinate assets to perform a mission.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 20:
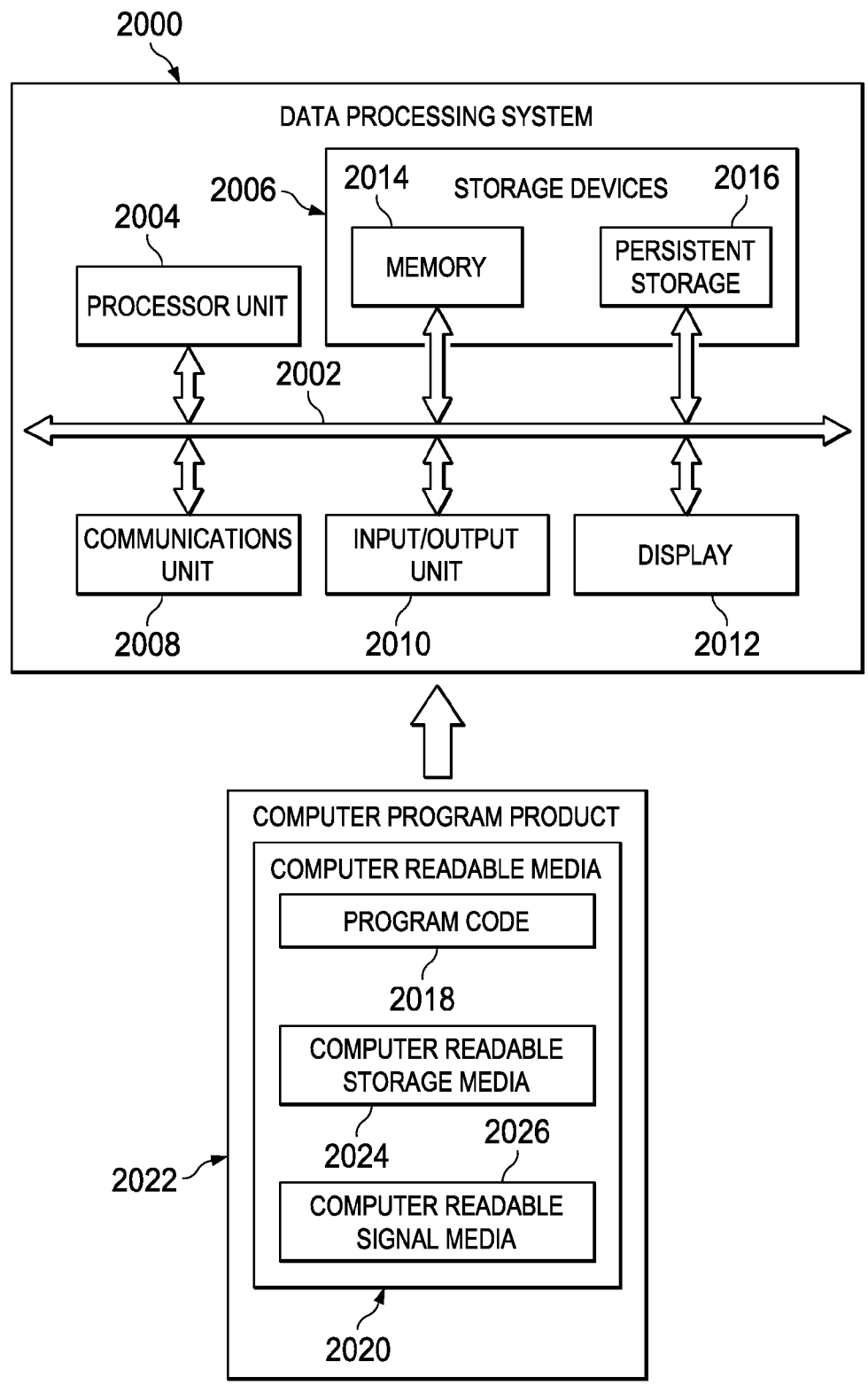
FIG. 20 is an illustration of a data processing system in the form of a block diagram in accordance with an illustrative embodiment.

Turning now to FIG. 20, an illustration of a data processing system in the form of a block diagram is depicted in accordance with an illustrative embodiment. Data processing system 2000 may be used to implement one or more computers in computer system 225 in FIG. 2. As depicted, data processing system 2000 includes communications framework 2002, which provides communications between processor unit 2004, storage devices 2006, communications unit 2008, input/output unit 2010, and display 2012. In some illustrative examples, communications framework 2002 may be implemented as a bus system.

Processor unit 2004 is configured to execute instructions for software to perform a number of operations. Processor unit 2004 may comprise a number of processors, a multi-processor core, and/or some other type of processor, depending on the implementation. In some cases, processor unit 2004 may take the form of a hardware unit, such as a circuit system, an application specific integrated circuit (ASIC), a programmable logic device, or some other suitable type of hardware unit.

Instructions for the operating system, applications, and/or programs run by processor unit 2004 may be located in storage devices 2006. Storage devices 2006 may be in communication with processor unit 2004 through communications framework 2002. As used herein, a storage device, also referred to as a computer readable storage device, is any piece of hardware capable of storing information on a temporary basis and/or a permanent basis. This information may include, but is not limited to, data, program code in a functional form, and/or other suitable information.

Memory 2014 and persistent storage 2016 are examples of storage devices 2006. Memory 2014 may take the form of, for example, a random access memory or some type of volatile or non-volatile storage device. Persistent storage 2016 may comprise any number of components or devices. For example, persistent storage 2016 may comprise a hard drive, a flash memory, a rewritable optical disk, a rewritable magnetic tape, or some combination of the above. The media used by persistent storage 2016 may or may not be removable.

Communications unit 2008 allows data processing system 2000 to communicate with other data processing systems and/or devices. Communications unit 2008 may provide communications using physical and/or wireless communications links.

Input/output unit 2010 allows input to be received from and output to be sent to other devices connected to data processing system 2000. For example, input/output unit 2010 may allow user input to be received through a keyboard, a mouse, and/or some other type of input device connected to data processing system 2000. As another example, input/output unit 2010 may allow output to be sent to a printer connected to data processing system 2000.

Display 2012 is configured to display information to a user. Display 2012 may comprise, for example, without limitation, a monitor, a touch screen, a laser display, a holographic display, a virtual display device, and/or some other type of display device.

In this illustrative example, the processes of the different illustrative embodiments may be performed by processor unit 2004 using computer-implemented instructions. These instructions may be referred to as program code, computer usable program code, or computer readable program code and may be read and executed by one or more processors in processor unit 2004.

In these examples, program code 2018 is located in a functional form on computer readable media 2020, which is selectively removable, and may be loaded onto or transferred to data processing system 2000 for execution by processor unit 2004. Program code 2018 and computer readable media 2020 together form computer program product 2022. In this illustrative example, computer readable media 2020 may be computer readable storage media 2024 or computer readable signal media 2026.

Computer readable storage media 2024 is a physical or tangible storage device used to store program code 2018 rather than a medium that propagates or transmits program code 2018. Computer readable storage media 2024 may be, for example, without limitation, an optical or magnetic disk or a persistent storage device that is connected to data processing system 2000.

Alternatively, program code 2018 may be transferred to data processing system 2000 using computer readable signal media 2026. Computer readable signal media 2026 may be, for example, without limitation, a propagated data signal containing program code 2018. This data signal may be an electromagnetic signal, an optical signal, and/or some other type of signal that can be transmitted over physical and/or wireless communications links.

The illustration of data processing system 2000 in FIG. 20 is not meant to provide architectural limitations to the manner in which the illustrative embodiments may be implemented. The different illustrative embodiments may be implemented in a data processing system that includes components in addition to or in place of those illustrated for data processing system 2000. Further, components shown in FIG. 20 may be varied from the illustrative examples shown.

Thus, the illustrative embodiments provide a method and apparatus for managing a water area. In particular, the illustrative embodiments may be used to manage a recreational water area to provide a desired level of safety to individuals who may engage in activities in the recreational water area.

The illustrative embodiments use at least one of unmanned vehicles, sensor systems, and other devices to collect information about locations in the recreational water area. This information may be used to determine when events arise within the recreational water area that require actions. These systems may supplement the use of lifeguards and other personnel to determine when events may require performing a mission. When such events occur, a mission is generated and assets are coordinated to perform the mission.

In these illustrative examples, unmanned vehicles such as unmanned aerial vehicles, unmanned water vehicles, and unmanned ground vehicles may be used to supplement existing personnel in performing missions. In some cases, the missions may be performed by unmanned vehicles without personnel.

With one or more illustrative embodiments, undesired results such as drownings, injuries, and other undesired results may be reduced or avoided. Further, with one or more illustrative embodiments, increased safety may be provided in recreational water areas without undesired increases in expenses. Further, the possibility of error or missed information may be reduced through the use of one or more of the illustrative embodiments.

Further, one or more illustrative embodiments provides new tools and processes to expand the ability of lifeguards to monitor and provide assistance in recreational water areas. For example, unmanned vehicles on the ground, in the air, on the water, or some combination thereof may increase the distance at which events can be detected. Further, the different unmanned vehicles may increase the speed at which responses to events requiring assistance or other action can be made.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A recreational water area management system comprising:
 a sensor system configured to generate information about the recreational water area;
 a group of autonomous vehicles, wherein the group of autonomous vehicles comprises an unmanned aerial vehicle, an unmanned ground vehicle, and an unmanned water vehicle; and
 a water area manager configured to:
 receive the information about the recreational water area from the sensor system,
 analyze the information to identify an event in which an individual need assistance, and
 coordinate the group of autonomous vehicles to perform a mission providing the assistance to the individual in the recreational water area based on the event;
 wherein the unmanned aerial vehicle comprises a buoyancy device and is configured to deploy the buoyancy device at a location of the individual; and wherein the unmanned water vehicle is configured to navigate to the location of individual and aid the individual in returning to a safe location in response to the unmanned aerial vehicle deploying the buoyancy device at the location of the individual.

2. The recreational water area management system of claim 1, wherein the mission is selected from one of an information collection mission, a rescue mission, a warning mission, and a search mission.

3. The recreational water area management system of claim 2, wherein the water area manager is configured to run a simulation to identify a potential condition in the recreational water area that requires at least one of the information collection mission, the rescue mission, and the warning mission.

4. The recreational water area management system of claim 1, wherein the event is an individual needing assistance and the mission is a rescue mission.

5. The recreational water area management system of claim 4, wherein operation of the group of autonomous vehicles is configured to perform a number of tasks in the rescue mission for the individual,
wherein the number of tasks is selected from at least one of
identifying information about the individual, marking a location of the individual,
delivering a buoyancy device to the individual, dropping a tracking buoy at the location of the individual,
carrying a number of rescue personnel to the location of the individual, and guiding a number of personnel to the location of the individual.

6. The recreational water area management system of claim 1, wherein the event is selected from one of
an individual drowning in water,
an individual located outside an allowed zone,
an individual having a cardiac condition,
an individual choking,
a fight between individuals,
a presence of a rip current,
a swimmer within a selected distance to a cliff face,
a swimmer greater than a selected distance from a shore,
a thunder storm within a selected distance to the recreational water area,
lightening within a selected distance to the recreational water area,
waves having a greater than desired height within a selected distance to the recreational water area,
a shark within a selected distance to the recreational water area,
a jelly fish within the recreational water area,
an individual on land having a medical condition,
an individual swept into the water, and
a water vehicle disabled in the recreational water area.

7. The recreational water area management system of claim 1, wherein the sensor system comprises a satellite, and wherein a portion of the information is received from the satellite.

8. The recreational water area management system of claim 3,
wherein the simulation is used to
identify conditions comprising current conditions and predicted conditions, and
generate the event with respect to the recreational water area; and
wherein the simulation is used to predict a presence of a shark.

9. The recreational water area management system of claim 1,
wherein the information includes information about an individual on a beach of the recreational water area and an individual in water of the recreational water area.

10. A method for managing a recreational water area, the method comprising:
receiving, by a computer system, information about the recreational water area from a sensor system;
analyzing, by the computer system, the information to identify an event in which an individual need assistance; and
coordinating, by the computer system, a group of autonomous vehicles to perform a mission providing the assistance to the individual based on the event;
wherein the group of autonomous vehicles comprises an unmanned aerial vehicle, an unmanned ground vehicle, and an unmanned water vehicle;
wherein the unmanned aerial vehicle is configured to deploy the buoyancy device at a location of the individual; and
wherein the unmanned water vehicle is configured to navigate to the location of individual and aid the individual in aid the individual in returning to a safe location in response to the unmanned aerial vehicle deploying the buoyancy device at a location of the individual.

11. The method of claim 10 further comprising:
generating, by the computer system, a portion of the information about the recreational water area using the sensor system.

12. The method of claim 10, wherein the mission is selected from one of an information collection mission, a rescue mission, a warning mission, and a search mission.

13. The method of claim 12 further comprising:
running a simulation, by the computer system, to identify a potential condition in the recreational water area that requires at least one of the information collection mission, the rescue mission, and the warning mission.

14. The method of claim 10, wherein the event is an individual needing assistance and the mission is a rescue mission.

15. The method of claim 14, wherein an operation of the group of autonomous vehicles is configured to perform a number of tasks in the rescue mission for the individual by selecting from at least one of identifying information about the individual, marking a location of the individual, delivering a buoyancy device to the individual, dropping a tracking buoy at the location of the individual, carrying a number of rescue personnel to the location of the individual, and guiding a number of personnel to the location of the individual.

16. The method of claim 10, wherein the event is selected from one of an individual drowning in water, an individual located outside an allowed zone, an individual having a cardiac condition, an individual choking, a fight between individuals, a presence of a rip current, a swimmer within a selected distance to a cliff face, a swimmer greater than a selected distance from a shore, a thunder storm within a selected distance to the recreational water area, lightening within a selected distance to the recreational water area, waves having a greater than desired height within a selected distance to the recreational water area, a shark within a selected distance to the recreational water area, a jelly fish within the recreational water area, an individual on land having a medical condition, an individual swept into the water, and a water vehicle disabled in the recreational water area.

* * * * *